(12) United States Patent
Limoli et al.

(10) Patent No.: US 12,458,304 B2
(45) Date of Patent: Nov. 4, 2025

(54) METHOD AND APPARATUS FOR AUTOMATICALLY ALIGNING A SCANNER WITH AN OBJECT TO BE SCANNED

(71) Applicant: NeuroLogica Corporation, a subsidiary of Samsung Electronics Co., Ltd., Danvers, MA (US)

(72) Inventors: Michael Limoli, Merrimac, MA (US); Richard DeSalvo, Danvers, MA (US); Cory Robinson, Danvers, MA (US); Ian MacKenzie, Danvers, MA (US)

(*) Notice: Subject to any disclaimer, the term of this patent is extended or adjusted under 35 U.S.C. 154(b) by 207 days.

(21) Appl. No.: 18/222,142

(22) Filed: Jul. 14, 2023

(65) Prior Publication Data

US 2024/0016457 A1 Jan. 18, 2024

Related U.S. Application Data

(60) Provisional application No. 63/389,047, filed on Jul. 14, 2022.

(51) Int. Cl.
| | |
|---|---|
| *A61B 6/04* | (2006.01) |
| *A61B 6/00* | (2024.01) |
| *A61B 6/03* | (2006.01) |
| *A61B 6/46* | (2024.01) |

(52) U.S. Cl.
CPC .......... *A61B 6/0492* (2013.01); *A61B 6/032* (2013.01); *A61B 6/4452* (2013.01); *A61B 6/4476* (2013.01); *A61B 6/461* (2013.01); *G06T 2207/30204* (2013.01)

(58) Field of Classification Search
CPC ..... A61B 6/0492; A61B 6/032; A61B 6/4452; A61B 6/4476; A61B 6/461; A61B 6/0407; A61B 6/0487; A61B 6/547; A61B 6/4405; G06T 2207/30204
See application file for complete search history.

(56) References Cited

U.S. PATENT DOCUMENTS

| | | |
|---|---|---|
| 2,765,860 A | 10/1956 | Church |
| 3,603,975 A | 9/1971 | Gordon |
| 3,775,612 A | 11/1973 | Foster et al. |

(Continued)

FOREIGN PATENT DOCUMENTS

| | | |
|---|---|---|
| CN | 1037450 | 11/1989 |
| CN | 202061023 | 12/2011 |

(Continued)

OTHER PUBLICATIONS

Munakata, Yu et al., An Active-caster Drive System for Motorizing a Manual Wheelchair, Proceedings of 2013 IEEE, International Conference on Mechatronics and Automation, Takamatsu, Japan, 2013.

*Primary Examiner* — Courtney D Thomas
(74) *Attorney, Agent, or Firm* — Pandiscio & Pandiscio

(57) ABSTRACT

Apparatus for aligning a scan field of a medical scanner with a patient support, the apparatus comprising: at least one fiducial marker mounted to the patient support; a camera mounted to the medical scanner for imaging the at least one fiducial marker mounted to the patient support; a transport mechanism for moving the medical scanner relative to the patient support; and a computing system for instructing the transport mechanism to move the medical scanner to align the scan field of the medical scanner with the patient support.

19 Claims, 33 Drawing Sheets

(56) References Cited

U.S. PATENT DOCUMENTS

| | | | |
|---|---|---|---|
| 3,904,878 | A | 9/1975 | Burch et al. |
| 4,006,359 | A | 2/1977 | Sullins et al. |
| 4,131,802 | A | 12/1978 | Braden et al. |
| 4,708,420 | A | 11/1987 | Liddiard |
| 4,928,283 | A | 5/1990 | Gordon |
| 4,935,949 | A | 6/1990 | Fujita et al. |
| 5,389,101 | A | 2/1995 | Heilbrun et al. |
| 5,448,607 | A | 9/1995 | McKenna |
| 5,638,419 | A | 6/1997 | Ingwersen |
| 5,736,821 | A | 4/1998 | Suyama |
| 5,802,719 | A | 9/1998 | O'Farrell, Jr. et al. |
| 5,867,553 | A | 2/1999 | Gordon et al. |
| 5,887,047 | A | 3/1999 | Bailey et al. |
| 5,982,843 | A | 11/1999 | Bailey et al. |
| 6,108,396 | A | 8/2000 | Bechwati et al. |
| 6,131,690 | A | 10/2000 | Galando et al. |
| 6,144,180 | A | 11/2000 | Chen et al. |
| 6,199,233 | B1 | 3/2001 | Kantrowitz et al. |
| 6,212,251 | B1 | 4/2001 | Tomura et al. |
| 6,256,404 | B1 | 7/2001 | Gordon et al. |
| 6,285,028 | B1 | 9/2001 | Yamakawa |
| 6,374,937 | B1 | 4/2002 | Galando et al. |
| 6,396,902 | B2 | 5/2002 | Tybinkowski et al. |
| 6,459,923 | B1 | 10/2002 | Plewes et al. |
| 6,705,758 | B1 | 3/2004 | Luusua et al. |
| 6,813,374 | B1 | 11/2004 | Karimi et al. |
| 6,857,778 | B2 | 2/2005 | Mun et al. |
| 6,959,068 | B1 | 10/2005 | Sommer |
| 6,985,766 | B2 | 1/2006 | Braun et al. |
| 7,175,347 | B2 | 2/2007 | Tybinkowski et al. |
| 7,319,738 | B2 | 1/2008 | Lasiuk et al. |
| 7,338,207 | B2 | 3/2008 | Gregerson et al. |
| 7,396,160 | B2 | 7/2008 | Tybinkowski et al. |
| 7,397,895 | B2 | 7/2008 | Bailey et al. |
| 7,438,471 | B2 | 10/2008 | Tybinkowski et al. |
| 7,568,836 | B2 | 8/2009 | Bailey et al. |
| 7,637,660 | B2 | 12/2009 | Tybinkowski et al. |
| 7,736,056 | B2 | 6/2010 | Tybinkowski et al. |
| 7,963,696 | B2 | 6/2011 | Bailey et al. |
| 8,118,488 | B2 | 2/2012 | Gregerson |
| 8,251,584 | B2 | 8/2012 | Tybinkowski et al. |
| 8,718,898 | B2 | 5/2014 | Schaible |
| 8,888,364 | B2 | 11/2014 | Bailey et al. |
| 8,905,637 | B2 | 12/2014 | Tybinkowski |
| 8,971,482 | B2 | 3/2015 | Bailey et al. |
| 9,016,941 | B2 | 4/2015 | Tybinkowski et al. |
| 9,554,953 | B2 | 1/2017 | Dirauf et al. |
| 9,561,010 | B2 | 2/2017 | Bailey et al. |
| 9,770,943 | B2 | 9/2017 | Liddiard |
| 9,820,704 | B2 | 11/2017 | Tybinkowski et al. |
| 10,687,770 | B2 | 6/2020 | Sullivan et al. |
| 11,369,326 | B2 | 6/2022 | Limoli et al. |
| 11,602,318 | B2 | 3/2023 | Sullivan et al. |
| 2002/0035317 | A1 | 3/2002 | Cheng et al. |
| 2003/0034687 | A1 | 2/2003 | Harris |
| 2003/0072613 | A1 | 4/2003 | Colvard |
| 2003/0095635 | A1 | 5/2003 | Moritake et al. |
| 2003/0147490 | A1 | 8/2003 | Stabe et al. |
| 2003/0206609 | A1 | 11/2003 | Kling et al. |
| 2005/0030604 | A1 | 2/2005 | Moore |
| 2005/0135560 | A1 | 6/2005 | Dafni et al. |
| 2005/0284672 | A1 | 12/2005 | Egen et al. |
| 2006/0083354 | A1 | 4/2006 | Tybinkowski et al. |
| 2007/0183588 | A1 | 8/2007 | Bailey et al. |
| 2007/0183589 | A1 | 8/2007 | Tybinkowski et al. |
| 2007/0195938 | A1 | 8/2007 | Bailey et al. |
| 2008/0064953 | A1* | 3/2008 | Falco .................. A61N 5/1049 600/427 |
| 2010/0172468 | A1 | 7/2010 | Gregerson |
| 2010/0180380 | A1 | 7/2010 | Van Scheppingen et al. |
| 2010/0299014 | A1 | 11/2010 | Bouvier |
| 2011/0222667 | A1 | 9/2011 | Gregerson et al. |
| 2011/0228910 | A1 | 9/2011 | Gregerson et al. |
| 2012/0181846 | A1 | 7/2012 | Liddiard |
| 2012/0256099 | A1 | 10/2012 | Gregerson et al. |
| 2012/0330087 | A1 | 12/2012 | Gregerson |
| 2013/0292918 | A1 | 11/2013 | Schlee et al. |
| 2013/0340167 | A1 | 12/2013 | Karwal et al. |
| 2014/0233702 | A1 | 8/2014 | Suzuki et al. |
| 2014/0241504 | A1 | 8/2014 | Lundström et al. |
| 2014/0251702 | A1 | 9/2014 | Berger et al. |
| 2014/0331406 | A1 | 11/2014 | Haider et al. |
| 2015/0023475 | A1 | 1/2015 | Gordon et al. |
| 2015/0051519 | A1 | 2/2015 | Morbi et al. |
| 2015/0085992 | A1 | 3/2015 | Grady |
| 2015/0196263 | A1 | 7/2015 | Bailey et al. |
| 2016/0242705 | A1 | 8/2016 | Richardson |
| 2017/0215826 | A1 | 8/2017 | Johnson et al. |
| 2017/0325763 | A1 | 11/2017 | Hoering et al. |
| 2018/0014796 | A1 | 1/2018 | Stanton et al. |
| 2019/0099141 | A1 | 4/2019 | Garlow et al. |

FOREIGN PATENT DOCUMENTS

| | | |
|---|---|---|
| CN | 202443134 | 9/2012 |
| DE | 10 2016 208 123 | 9/2017 |
| JP | HEI 11-164829 | 6/1999 |
| JP | 2002085394 | 3/2002 |
| JP | 2003-190149 | 7/2003 |
| WO | WO 98/00681 | 1/1999 |
| WO | WO 2016/066436 | 5/2016 |
| WO | WO 2017/180566 | 10/2017 |
| WO | WO 2017/180568 | 10/2017 |
| WO | WO 2017/180569 | 10/2017 |
| WO | WO 2017/180570 | 10/2017 |

* cited by examiner

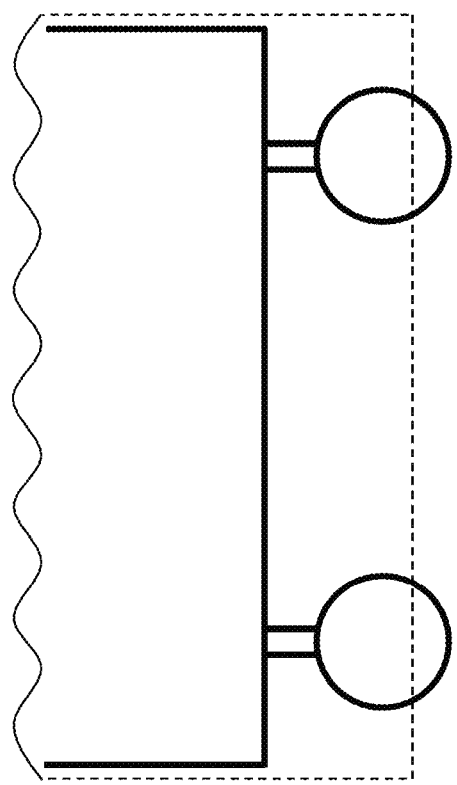

METHOD AND APPARATUS FOR AUTOMATICALLY ALIGNING A SCANNER WITH AN OBJECT TO BE SCANNED

REFERENCE TO PENDING PRIOR PATENT APPLICATION

This patent application claims benefit of prior U.S. Provisional Patent Application Ser. No. 63/389,047, filed Jul. 14, 2022 by NeuroLogica Corporation, a subsidiary of Samsung Electronics Co., Ltd. for MOBILE MEDICAL SCANNER WITH AUTOALIGN FEATURE.

The above-identified patent application is hereby incorporated herein by reference.

FIELD OF THE INVENTION

This invention relates to imaging systems in general, and more particularly to novel methods and apparatus for directing and controlling movement of mobile anatomical imaging systems.

BACKGROUND OF THE INVENTION

In many situations it can be desirable to image the interior of opaque objects. By way of example but not limitation, in the medical field, it can be desirable to image the interior of a patient's body so as to allow viewing of internal structures without physically penetrating the skin.

Computerized Tomography (CT) has emerged as a key imaging modality in the medical field. CT imaging systems generally operate by directing X-rays into the body from a variety of positions, detecting the X-rays passing through the body, and then processing the detected X-rays so as to build a three-dimensional (3D) data set and a 3D computer model of the patient's anatomy. The 3D data set and 3D computer model can then be visualized so as to provide images (e.g., slice images, 3D computer images, etc.) of the patient's anatomy.

By way of example but not limitation, and looking now at FIGS. 1 and 2, there is shown an exemplary CT imaging system 5. CT imaging system 5 generally comprises a torus 10 which is supported by a base 15. A center opening 20 is formed in torus 10. Center opening 20 receives the patient anatomy which is to be scanned.

Looking next at FIG. 3, torus 10 generally comprises a fixed gantry 22, a rotating disc 23, an X-ray tube assembly 25 and an X-ray detector assembly More particularly, fixed gantry 22 is disposed concentrically about center opening 20. Rotating disc 23 is rotatably mounted to fixed gantry 22. X-ray tube assembly 25 and X-ray detector assembly 30 are mounted to rotating disc 23 in diametrically-opposing relation, such that an X-ray beam 40 (generated by X-ray tube assembly 25 and detected by X-ray detector assembly 30) is passed through the patient anatomy disposed in center opening 20. Inasmuch as X-ray tube assembly 25 and X-ray detector assembly 30 are mounted on rotating disc 23 so that they are rotated concentrically about center opening 20, X-ray beam 40 will be passed through the patient's anatomy along a full range of radial positions, so as to enable CT imaging system 5 to create a "slice" image of the anatomy penetrated by the X-ray beam. Furthermore, by moving the patient and CT imaging system 5 relative to one another during scanning, a series of slice images can be acquired, and thereafter appropriately processed, so as to create a 3D data set of the scanned anatomy and a 3D computer model of the scanned anatomy. In practice, it is common to configure X-ray detector assembly 30 so that multiple slices of images (e.g., 8 slices, 16 slices, 32 slices, etc.) may be acquired with each rotation of rotating disc 23, whereby to speed up the acquisition of scan data.

In practice, it is now common to effect helical scanning of the patient's anatomy so as to generate a 3D data set of the scanned anatomy, which can then be processed to build a 3D computer model of the scanned anatomy. The 3D data set and 3D computer model can then be visualized so as to provide images (e.g., slice images, 3D computer images, etc.) of the patient's anatomy.

The various electronic hardware and software for controlling the operation of rotating disc 23, X-ray tube assembly 25 and X-ray detector assembly 30, as well as for processing the acquired scan data so as to generate the desired slice images, 3D data set and 3D computer model, may be of the sort well known in the art and may be located in torus 10 and/or base 15.

In many cases CT imaging system 5 is intended to be stationary, in which case base 15 of CT imaging system 5 is set in a fixed position on the floor of a room and a special motorized scanning table is provided to move the patient relative to CT imaging system 5 during scanning. More particularly, with a stationary CT imaging system 5, the patient is brought to the location of CT imaging system 5, the patient is placed on the motorized scanning table, and then the motorized scanning table is used to move the patient relative to CT imaging system 5 (i.e., to advance the patient into center opening 20 of CT imaging system 5) so that some or all of the length of the patient may be scanned by CT imaging system 5.

In other cases CT imaging system 5 is intended to be mobile so that the CT imaging system may be brought to the patient and the patient scanned at the patient's current location, rather than requiring that the patient be transported to the location of the CT imaging system. Scanning the patient with a mobile CT imaging system 5 can be highly advantageous, since it can reduce delays in patient scanning (e.g., the patient can be scanned in an emergency room rather than waiting to be transported to the radiology department) and/or it can allow the patient to be scanned without requiring movement of the patient (e.g., the patient can be scanned at their bedside in an intensive care unit, "ICU").

To this end, and looking now at FIGS. 4 and 5, base 15 may comprise a transport assembly 50 for (i) moving mobile CT imaging system 5 to the patient prior to scanning and (ii) moving the CT imaging system relative to the patient during scanning. More particularly, transport assembly 50 preferably comprises (i) a gross movement mechanism 55 for moving CT imaging system 5 relatively quickly across room distances, so that the CT imaging system can be quickly and easily brought to the bedside of the patient, such that the patient can be scanned at their bedside without needing to be moved to a radiology department, and (ii) a fine movement mechanism 60 for moving the CT imaging system precisely, relative to the patient, during scanning so that the patient can be scanned on their bed or gurney without needing to be moved onto a special motorized scanning table.

In one form of the invention, gross movement mechanism 55 comprises a plurality of free-rolling casters 62, and fine movement mechanism 60 comprises a plurality of centipede belt drives 63 (which can be configured for either stepped or continuous motion, whereby to provide either stepped or continuous scanning of the patient). Hydraulic apparatus 65 permits either gross movement mechanism 55 or fine movement mechanism 60 to be engaged with the floor, whereby to facilitate appropriate movement of mobile CT imaging system 5.

Thus, with a mobile CT imaging system 5, the CT mobile imaging system may be pre-positioned in an "out of the way" location (e.g., in an unused corner of an emergency room) and then, when a patient requires scanning, the patient may be quickly and easily scanned at their bedside, by simply moving the mobile CT imaging system to the patient's bedside on gross movement mechanism 55 (e.g., casters 62), and thereafter moving the mobile CT imaging system during scanning on fine movement mechanism 60 (e.g., centipede belt drives 63).

Alternatively, if desired, the mobile CT imaging system may comprise a transport assembly comprising a gross movement mechanism and/or fine movement mechanism that differs from the aforementioned gross movement mechanism 55 and fine movement mechanism 60. By way of example but not limitation, the transport assembly 50 of an exemplary mobile imaging system 5 may comprise (i) powered omnidirectional wheels 70 (e.g., so-called "mecanum wheels", "omni wheels" or "ilon wheels", etc.) for moving the mobile imaging system 5 to a desired scan location (e.g., adjacent to the bed of a patient), and powered scan wheels 75 for moving the mobile imaging system 5 relative to the patient during scanning (see FIGS. 6 and 7); or (ii) powered omnidirectional castors for both moving the mobile imaging system 5 to a desired scan location (e.g., adjacent to the bed of a patient) and for moving the mobile imaging system 5 relative to the patient during scanning (see FIGS. 7A and 7B); or (iii) powered omnidirectional wheels 70 (e.g., so-called "mecanum wheels", "omni wheels" or "ilon wheels", etc.) for both moving the mobile imaging system 5 to a desired scan location (e.g., adjacent to the bed of a patient) and for moving the mobile imaging system 5 relative to the patient during scanning; or (iv) powered omnidirectional wheels 80 (e.g., so-called "Liddiard wheels") for both moving the mobile imaging system 5 to a desired scan location (e.g., adjacent to the bed of a patient) and for moving the mobile imaging system 5 relative to the patient during scanning (see FIGS. 8 and 9, which show a mobile imaging system 5 comprising powered omnidirectional wheels 80, and FIGS. 10 and 11 which show a mobile imaging system 5 comprising a "doubled up" configuration of omnidirectional wheels 80).

The movement mechanisms of FIGS. 6-11 are discussed in further detail in U.S. Pat. No. 11,369,326, issued Jun. 28, 2022 to NeuroLogica Corporation, a subsidiary of Samsung Electronics Co., Ltd. for MOBILE ANATOMICAL IMAGING SYSTEM WITH IMPROVED MOVEMENT SYSTEM COMPRISING LIDDIARD WHEELS Ser. No. 16/895,257, which patent is hereby incorporated herein by reference.

Other movement mechanisms for moving a mobile imaging system relative to a patient during scanning will be apparent to those of skill in the art in view of the present disclosure.

During scanning, the anatomy to be scanned (e.g., the body of the patient, the head of the patient, a limb of the patient, etc.) is disposed on a stationary patient support (e.g., a scanning table, gurney, radiolucent extension, etc.). More particularly, the patient support may comprise X-ray transparent bed and gurney extenders ("scanboards") configured for use with mobile computerized tomography (CT) imaging systems. See, for example, FIG. 12 which shows an exemplary patient support 85.

In essence, such prior art scanboards provide X-ray transparent (i.e., radiolucent) supports for supporting patient anatomy (e.g., a neck and head, an arm, etc.) adjacent to the end of a bed or gurney while the anatomy is being scanned by mobile CT imaging system 5. Further details of exemplary patient supports (e.g., scanboards) configured for use with a mobile CT imaging system are disclosed in U.S. Pat. No. 7,736,056, issued Jun. 15, 2010 to NeuroLogica Corp. for X-RAY TRANSPARENT BED AND GURNEY EXTENDER FOR USE WITH MOBILE COMPUTERIZED TOMOGRAPHY (CT) IMAGING SYSTEMS Ser. No. 11/803,241 and U.S. Pat. No. 8,905,637, issued Dec. 9, 2014 to NeuroLogica Corp. for X-RAY TRANSPARENT BED AND GURNEY EXTENDER FOR USE WITH MOBILE COMPUTERIZED TOMOGRAPHY (CT) IMAGING SYSTEMS Ser. No. 12/574,476, which U.S. patents are hereby incorporated herein by reference.

Regardless of how the mobile CT imaging system is moved relative to the patient during scanning, and regardless of the particular patient support upon which the anatomy to be scanned is disposed, it is critical that the scan field generated by the mobile CT imaging system be properly aligned with the anatomy that is to be scanned during scanning.

By way of example but not limitation, with the aforementioned mobile CT imaging system 5, it is desirable that center opening 20 formed in torus 10 (i.e., the "scan field" of the mobile CT imaging system) be centered on the anatomy that is to be scanned during scanning. Stated another way, it is desirable to align center opening 20 of mobile CT imaging system 5 with the centerline of patient support upon which the anatomy to be scanned is disposed before commencement of scanning.

Thus, it has been found that where a mobile CT imaging system is used to scan a patient disposed on a patient support, it is important to properly align the mobile CT imaging system, and hence the center opening thereof, with the patient support prior to commencement of scanning.

However, it has been found that where the mobile CT imaging system becomes larger (e.g., such as where the mobile CT imaging system is sized for full-body scans), achieving proper alignment of center opening with a stationary patient support can become problematic. By way of example but not limitation, where the mobile CT imaging system is sized for full-body scans, the mobile CT imaging system can weigh thousands of pounds and it can require substantial effort by a user to physically move the mobile CT imaging system so as to properly align center opening with a stationary patient support.

Thus there is a need for a new and improved system for facilitating the automatic proper alignment of a scan field (e.g., the center opening of a CT machine) with a patient support (e.g., a scanboard) upon which the anatomy to be scanned is disposed, which system is configured to automatically move the scanner as appropriate such that the centerline of the scanning field of the scanner (e.g., the center opening of a CT machine) is aligned with the centerline of the patient support during the scanning procedure.

SUMMARY OF THE INVENTION

More particularly, and as will hereinafter be discussed in further detail, the present invention comprises the provision and use of a novel system comprising (i) a patient support provided with alignment targets (i.e., fiducial markers) thereon, (ii) a mobile medical scanner which is provided with a camera system for detecting the alignment targets (i.e., fiducial markers) on the patient support, (iii) a transport mechanism for moving the mobile medical scanner relative to the patient support, and (iv) a computing system for automatically moving the mobile medical scanner to the correct scan position relative to the patient support (and hence relative to the patient being scanned), whereupon the mobile medical scanner can be used to scan the patient.

In one form of the invention, there is provided apparatus for aligning a scan field of a medical scanner with a patient support, the apparatus comprising:
- at least one fiducial marker mounted to the patient support;
- a camera mounted to the medical scanner for imaging the at least one fiducial marker mounted to the patient support;
- a transport mechanism for moving the medical scanner relative to the patient support; and
- a computing system for instructing the transport mechanism to move the medical scanner to align the scan field of the medical scanner with the patient support.

In another form of the invention, there is provided a method for aligning a scan field of a medical scanner with a patient support, wherein the medical scanner comprises at least one camera mounted to the medical scanner and a transport mechanism for moving the medical scanner, and further wherein the patient support comprises at least one fiducial marker mounted to the patient support, the method comprising:
- using the camera to obtain an image of the at least one fiducial marker mounted to the patient support;
- calculating at least one of (i) an angular disposition of the medical scanner relative to the patient support, (ii) a distance between the medical scanner and the patient support, and (iii) a distance between a center axis of the scan field of the medical scanner and a center axis of the patient support; and
- moving the medical scanner to align the center axis of the scan field of the medical scanner with the center axis the patient support.

In another form of the invention, there is provided apparatus for aligning a scan field of a scanner with an object, the apparatus comprising:
- at least one fiducial marker mounted to the object;
- a camera mounted to the scanner for imaging the at least one fiducial marker mounted to the object;
- a transport mechanism for moving the scanner relative to the object; and
- a computing system for moving the scanner to align the scan field of the scanner with the object.

In another form of the invention, there is provided a method for aligning a scan field of a scanner with an object, wherein the scanner comprises at least one camera mounted to the scanner and a transport mechanism for moving the scanner, and further wherein the object comprises at least one fiducial marker mounted to the object, the method comprising:
- using the camera to obtain an image of the at least one fiducial marker mounted to the object;
- calculating at least one of (i) an angular disposition of the scanner relative to the object, (ii) a distance between the scanner and the object, and (iii) a distance between a center axis of the scan field of the scanner and a center axis of the object; and
- moving the scanner to align the center axis of the scan field of the scanner with the center axis of the object.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIGS. 7A and 7B are schematic views showing still another exemplary transport assembly for an exemplary mobile CT imaging system;

DETAILED DESCRIPTION OF THE PREFERRED EMBODIMENTS

For the purposes of the following discussion, it is helpful to identify the various axes associated with an exemplary medical scanner (e.g., a CT imaging system) and an exemplary patient support (e.g., a scanboard). To this end, the "X-axis" will be considered to be the axis extending parallel to the floor over which the CT imaging system moves, the "Y-axis" will be considered to be the axis extending perpendicular to the floor, and the "Z-axis" will be considered to be the axis extending parallel to the longitudinal axis of the center opening of the torus of the medical scanner (see FIG. 1).

The present invention comprises the provision and use of a novel system comprising (i) a patient support provided with alignment targets (i.e., fiducial markers) thereon, (ii) a mobile medical scanner which is provided with a camera system for detecting the alignment targets (i.e., fiducial markers) on the patient support, (iii) a transport mechanism for moving the mobile medical scanner relative to the patient support, and (iv) a computing system for automatically moving the mobile medical scanner to the correct scan position relative to the patient support (and hence relative to the patient being scanned), whereupon the mobile medical scanner can be used to scan the patient.

Figure 13:
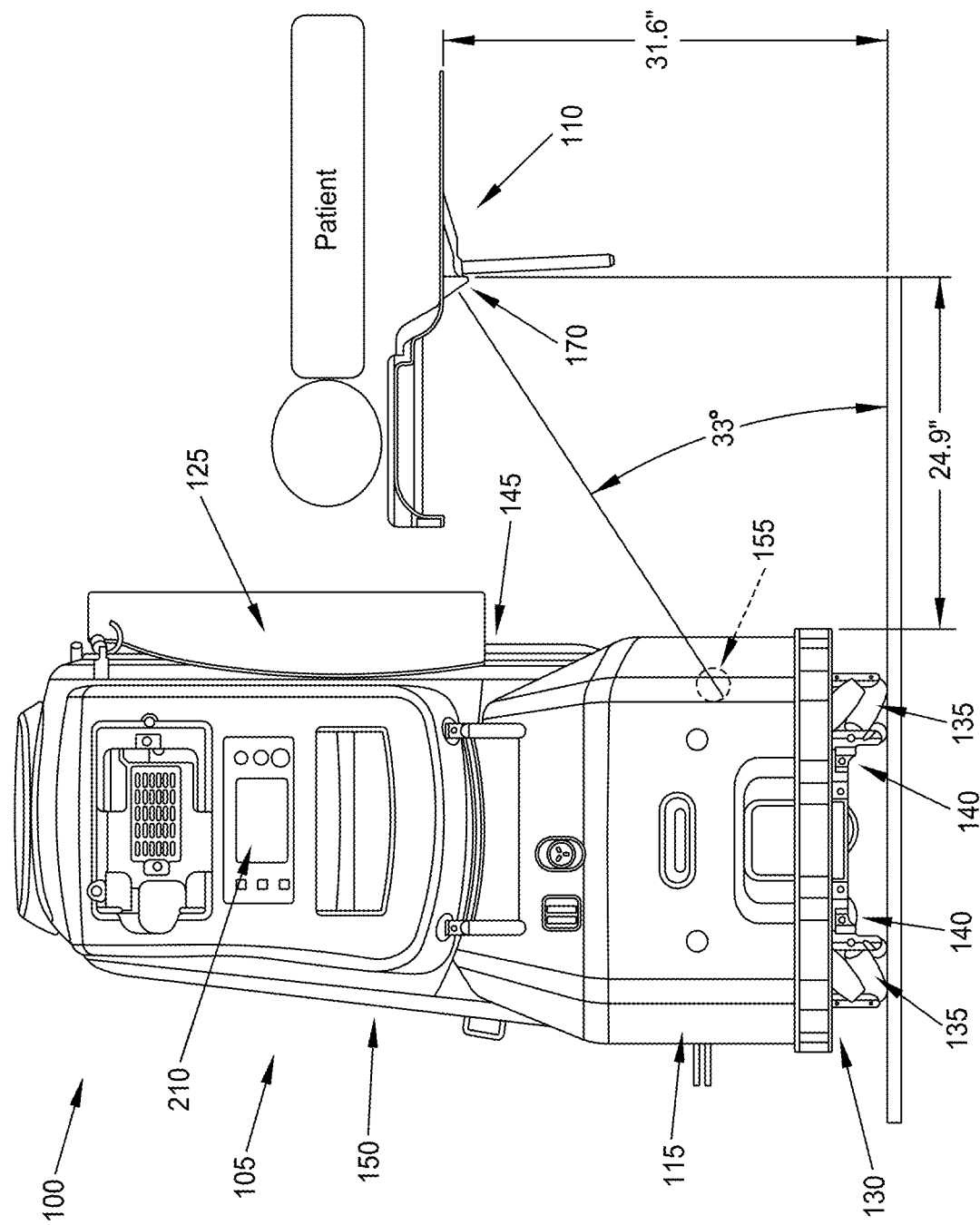
FIG. 13 is a schematic view showing a novel scanner alignment system formed in accordance with the present invention.
Figure 14:
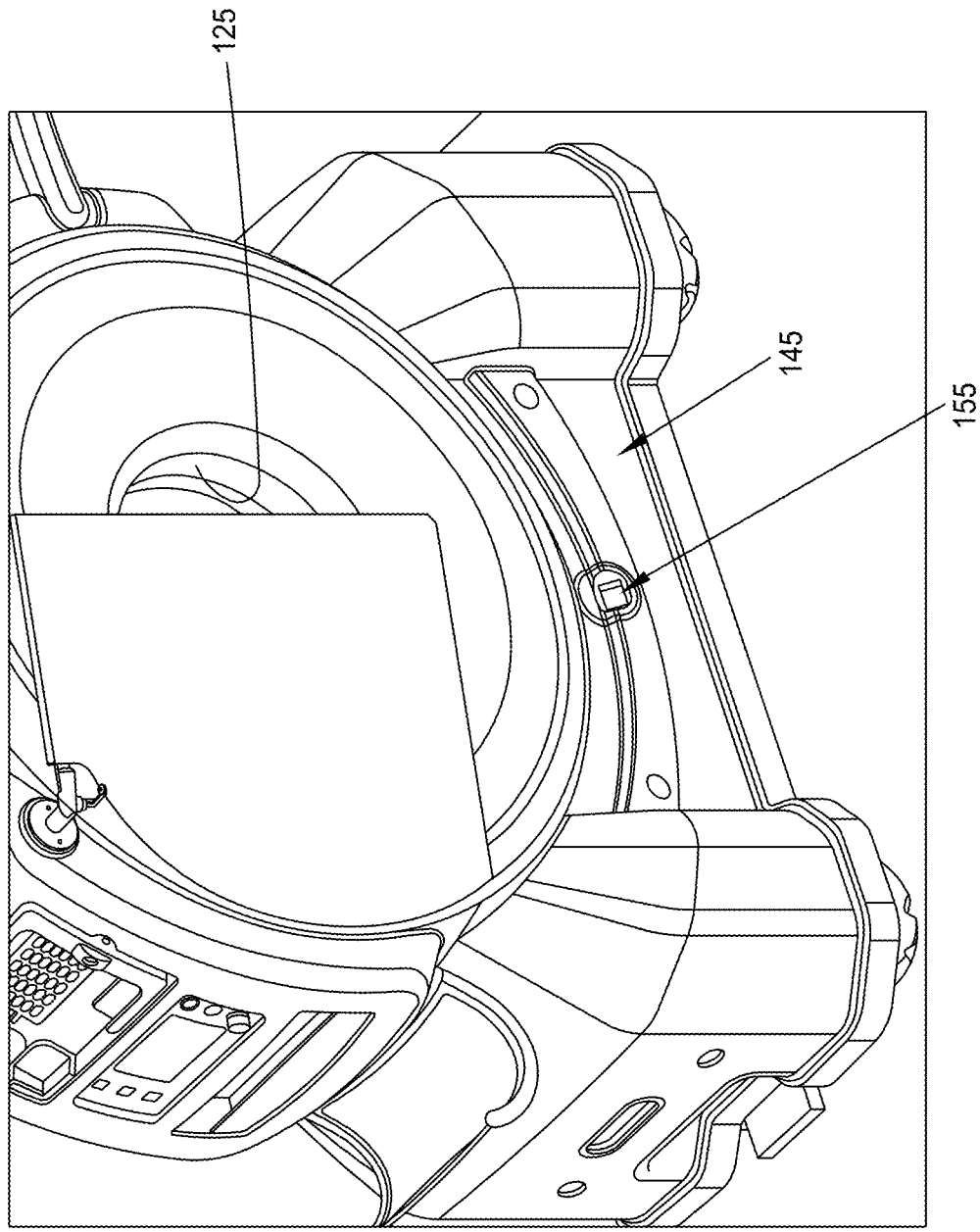
FIGS. 14 and 15 are schematic views showing further aspects of the novel scanner alignment system of FIG. 13.
Figure 15:
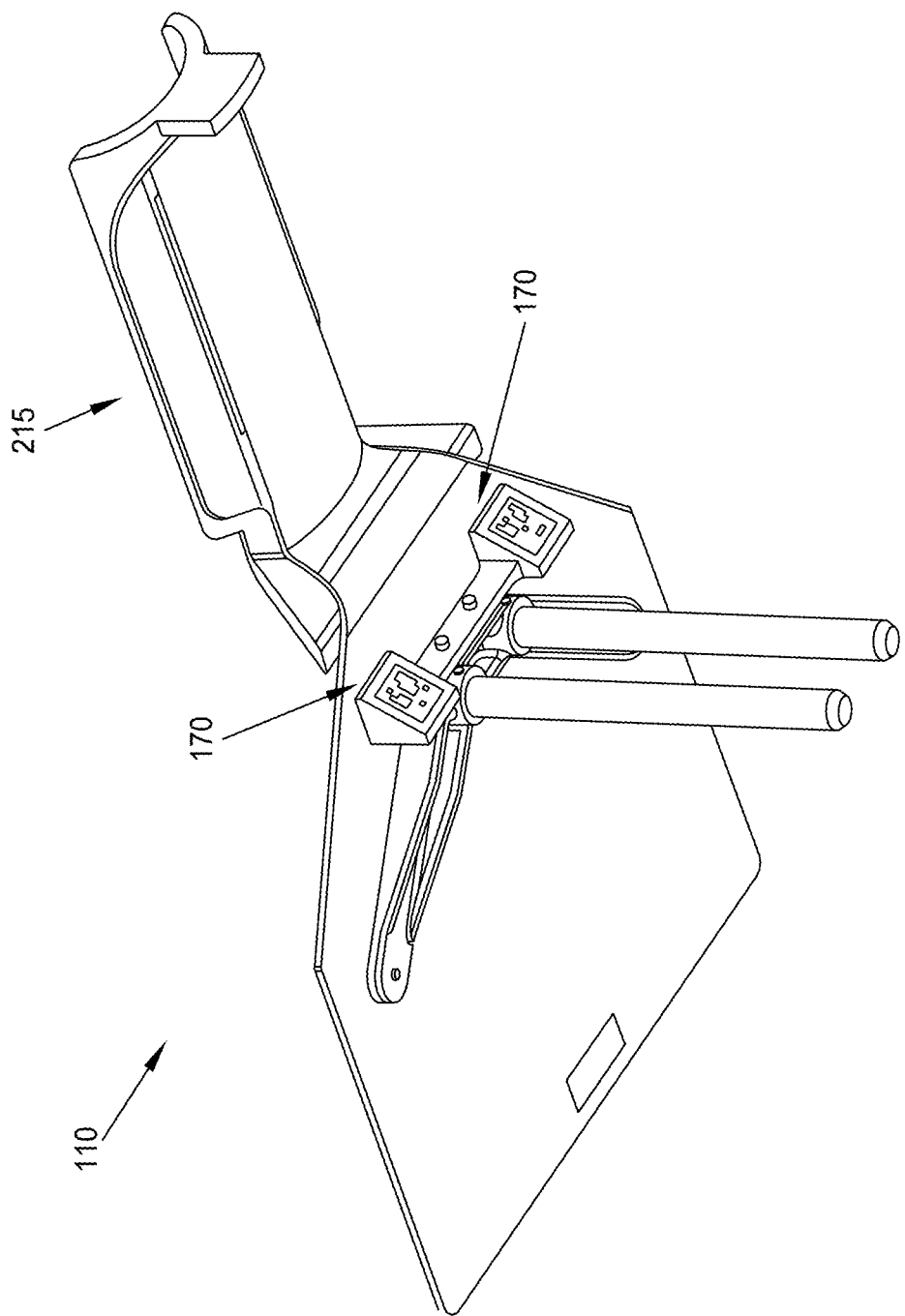

Looking now at FIGS. 13-15, there is shown a novel scanner alignment system 100 formed in accordance with the present invention. Novel scanner alignment system 100 generally comprises a scanner 105 (e.g., a mobile CT scanner such as the aforementioned CT imaging system 5) and a patient support 110 (e.g., a patient support similar to the aforementioned patient support 85).

Scanner 105 is preferably a CT scanner comprising a base 115, a torus 120 mounted to base 115, and a center opening 125 (partially obscured in FIG. 14 by a curtain, however, identical to center opening 20 of CT imaging system 5 depicted in FIG. 1) formed in torus 120 for receiving the object (e.g., anatomy) to be scanned. Scanner 105 further comprises a transport assembly 130 for moving scanner 105 to a desired scan location. In a preferred form of the present invention, scanner 105 comprises a gross movement mechanism 135 (e.g., the aforementioned powered omnidirectional wheels 70, the aforementioned powered omnidirectional wheels 80, etc.) for moving scanner 105 to a desired scan location and a fine movement mechanism 140 (e.g., the aforementioned centipede belt drives 63, the aforementioned powered scan wheels 75, etc.) for moving scanner 105 relative to the patient during scanning. However, transport assembly 130 could comprise a single mechanism for both moving scanner 105 to a desired scan location and for moving scanner 105 relative to the patient during scanning. Scanner 105 further comprises a scan side 145 (i.e., the side of scanner 105 which faces patent support 110) and an exit side 150 (i.e., the side of scanner 105 that faces away from patient support 110).

Looking now at FIGS. 13 and 14, an alignment camera 155 is mounted to scan side 145 of scanner 105, preferably centered on the central axis of center opening 125, below torus 120. If desired, a separate drive camera 160 may be provided in order to provide safety functionality, as will hereinafter be discussed.

Scanner alignment system 100 further comprises a computing system 165 (FIG. 16) generally comprising a central processing unit (CPU) and memory (not shown) comprising appropriate software for processing image data received from alignment camera 155 and/or drive camera 160 and/or for controlling movement of scanner 105 via transport assembly 130, as will hereinafter be discussed in further detail. Computing system 165 may be carried by scanner 105 (e.g., disposed in base 115 and powered by an on-board battery), or computing system 165 may be wirelessly connected to cameras 155, 160, as will be apparent to one of skill in the art in view of the instant disclosure.

Looking now at FIG. 15, patient support 110 comprises at least one fiducial marker 170. In a preferred form of the invention, patient support 110 comprises a pair of fiducial markers 170 disposed side-by-side. Fiducial markers 170 comprise optical patterns that may be viewed by alignment camera 155 when scan side 145 of scanner 105 faces patient support 110, and recognized by software running on computing system 165, as will hereinafter be discussed in further detail. By way of example but not limitation, fiducial markers 170 may comprise optical Quick Response (QR) codes.

As will hereinafter be discussed in further detail, and looking now at FIG. 16, when scanner 105 is disposed such that scan side 145 of scanner 105 faces in the general direction of patient support 110 such that camera 155 can view fiducial markers 170, a user (e.g., a technician, physician, etc.) uses computing system 165 to initiate a software program 175 carried by computing system 165. Software program 175 (i) uses alignment camera 155 and fiducial markers 170 to determine whether center opening 125 of scanner 105 is appropriately aligned with patient support 110 to initiate scanning, and (ii) if not, effects movement of transport assembly 130 to properly align center opening 125 of scanner 105 with patient support 110.

Figure 16:
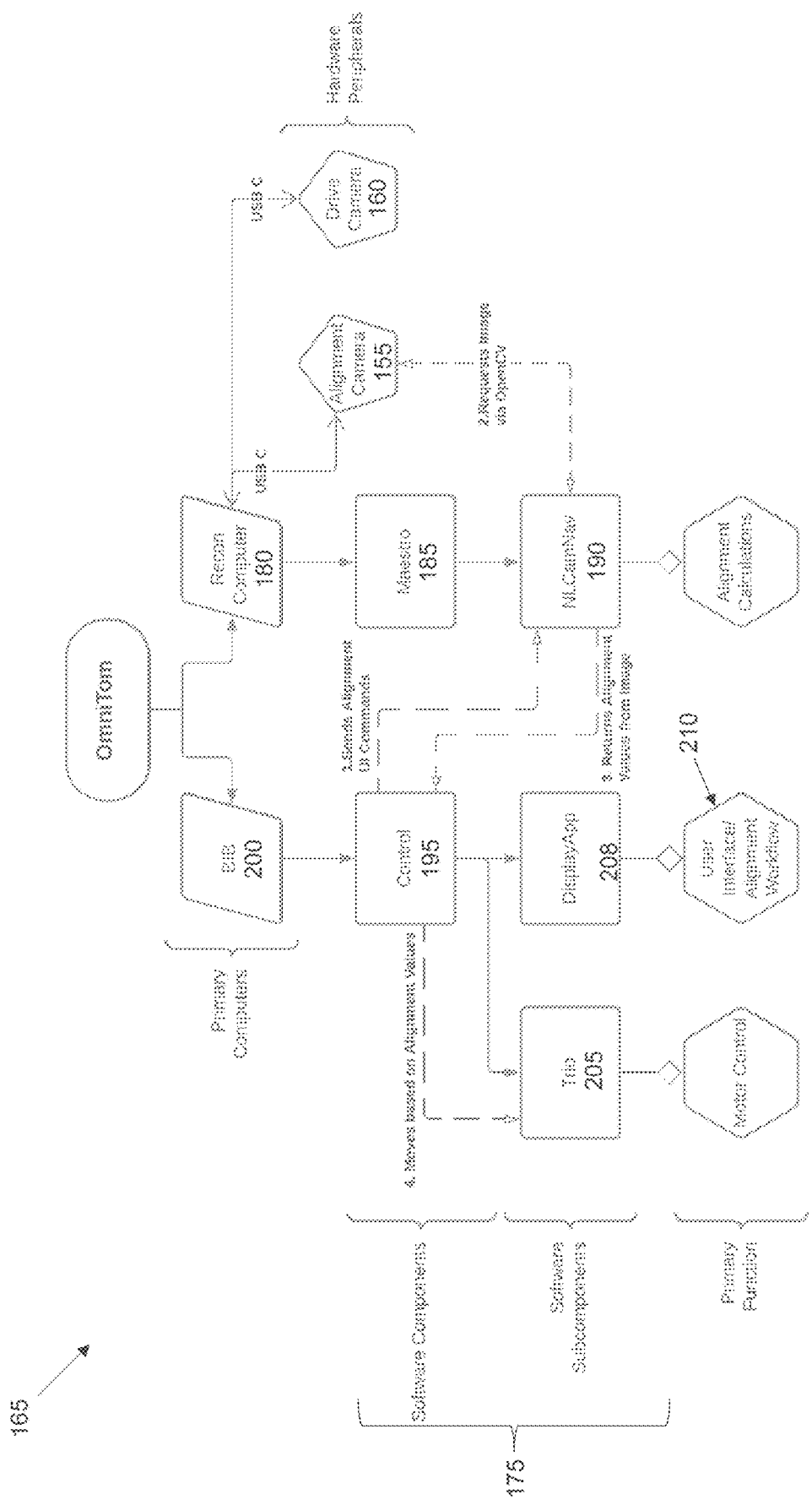
FIG. 16 is a flowchart showing aspects of a novel computing system formed in accordance with the present invention.

More particularly, and still looking at FIG. 16, computing system 165 comprises a recon computer 180 for receiving and processing data received from alignment camera 155 and (if provided) drive camera 160. Recon computer 180 communicates with a software component ("Maestro") 185 configured to orchestrate the different software components of recon computer 180 which, in turn, communicates with a software subcomponent ("NLCamNav") 190 configured to receive images from alignment camera 155, recognize fiducial markers 170, and send data concerning the alignment of scanner 105 relative to patient support 110 (e.g., alignment calculations reflecting angular displacement of and/or distance of medical scanner 105 relative to patient support 110) to a controller 195, as will hereinafter be discussed. Computing system 165 further comprises a Base Interface Board (BIB) 200 configured to interface with controller 195, whereby to permit control of transport assembly 130 (e.g., to operate gross movement mechanism 135 and/or fine movement mechanism 140 as necessary) to adjust alignment and/or distance of scanner 105 relative to patient support 110 in response to data received from software component ("NLCamNav") 190. A software subcomponent ("Trio") 205 is provided to interface between controller 195 and transport assembly 130, whereby to translate commands from controller 195 into appropriate movements of scanner 105 (e.g., using gross movement mechanism 135 and/or fine movement mechanism 140). A display unit 208 having a display screen 210 (e.g., a touchscreen interface) is preferably provided (e.g., mounted to the exterior of scanner 105, see FIG. 13) for providing information to the user of scanner 105 from computer system 165 and/or for receiving commands from the user of scanner 105 to be sent to computing system 165, in a manner that will be apparent to one of skill in the art in view of the instant disclosure.

In use, a user (e.g., a technician, a physician, etc.) moves scanner 105 into a hospital room where a patient/object to be scanned is disposed on a patient support 110 (e.g., using gross movement mechanism) and sets up the system to scan a patient (or object) disposed on patient support 110. Typically, patient support 110 comprises a scanboard 215 (FIG. 15) which is a cantilevered radiolucent headrest (or other extension) mounted to, and protruding from, patient support 110, allowing scanner 105 to move during scanning such that scanboard 215 (and hence, patient/anatomy disposed on scanboard 215) is received within center opening 125 of scanner 105.

Figure 17:
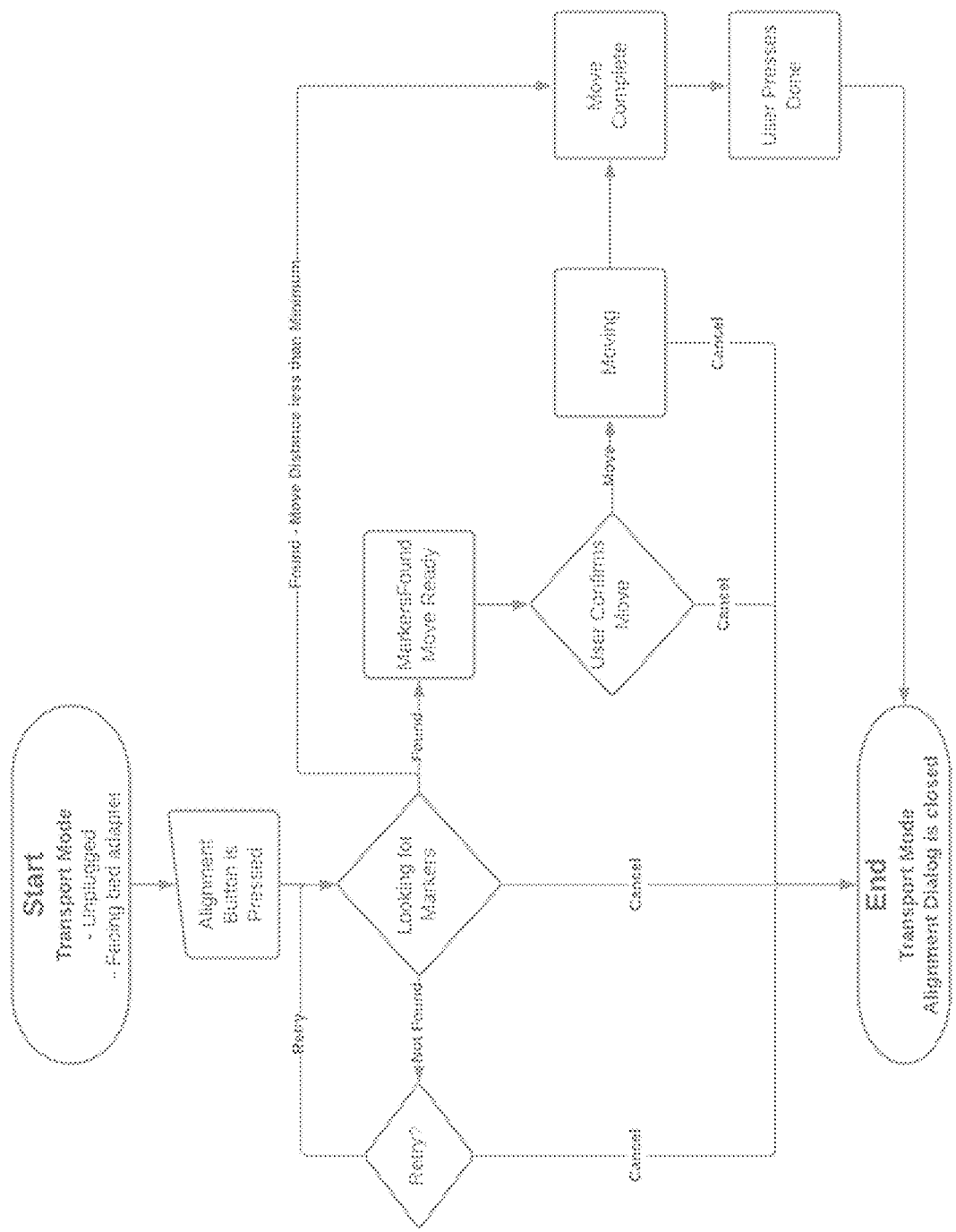
FIG. 17 is a flowchart showing further aspects of the novel computing system of FIG. 16.
Figure 18:
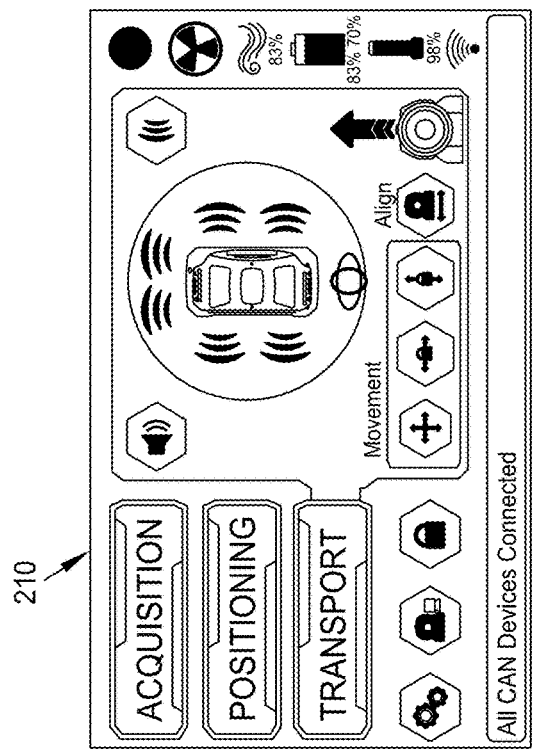

Next, the user positions the scanner at the head of patient support 110, with scan side 145 of scanner 105 generally facing towards patient support 110. The user then uses display screen 210 to cause computing system 165 to run software program 175. See FIG. 17 which shows a flowchart illustrating how computing system 165 operates to locate fiducial markers 170 on patient support 110 and/or initiate movement of scanner 105 to achieve proper alignment. See also FIG. 18, which shows an exemplary screenshot of display screen 210 when computing system 165 is ready to be initiated.

Figure 19:
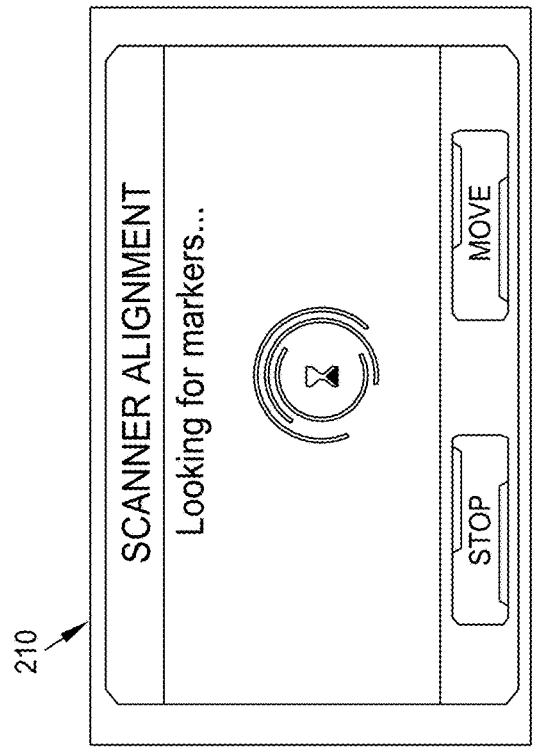
FIGS. 18-21 show exemplary screenshots from the novel computing system of FIG. 16 which may be displayed to a user.
Figure 20:
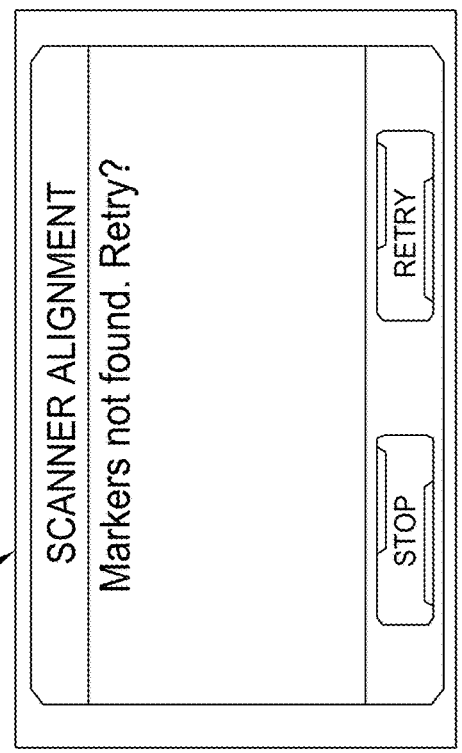
Figure 27:
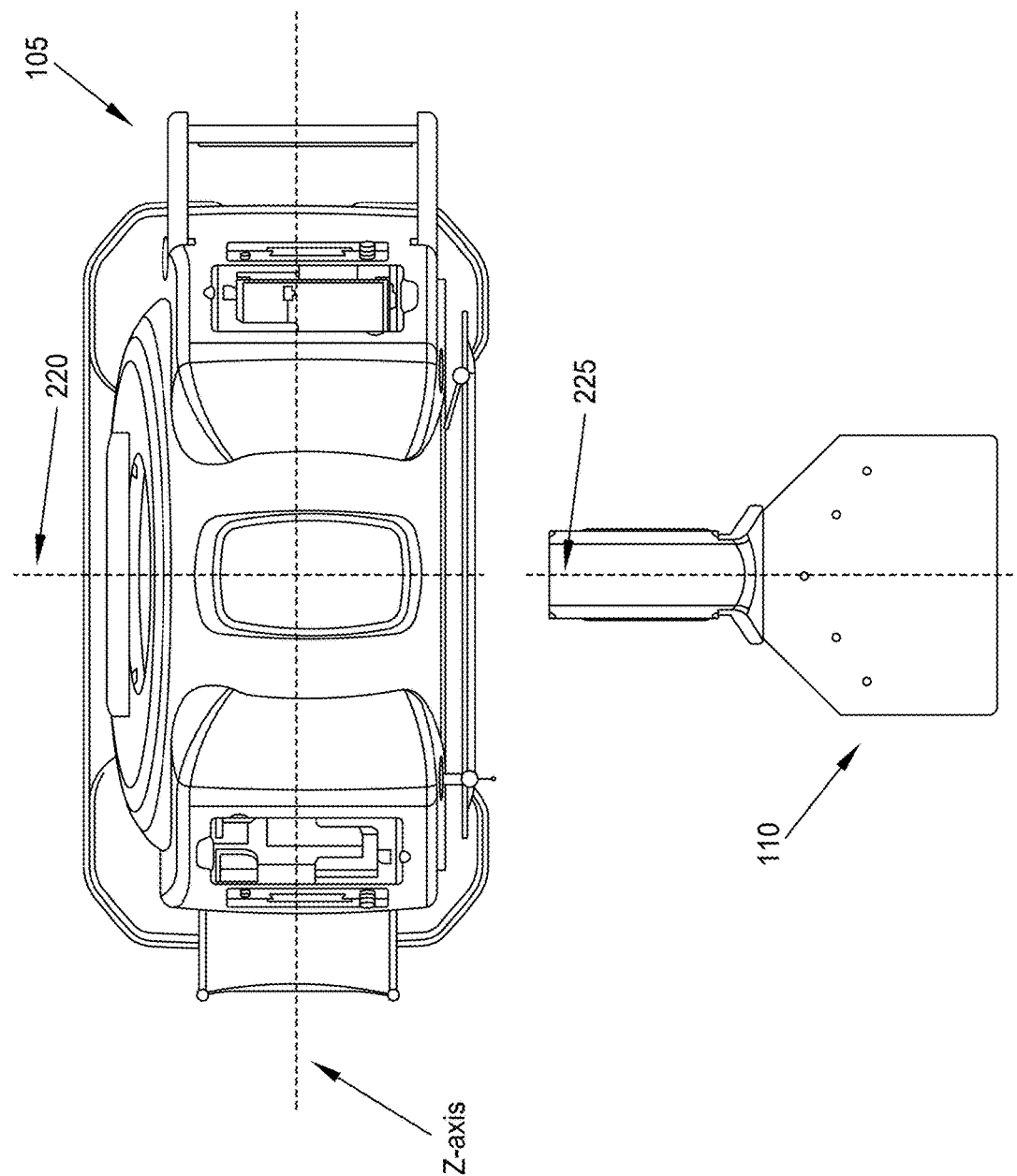

Once initiated, computing system 165 uses recon computer 180, software subcomponent ("NLCamNav") 190 and alignment camera 155 to locate fiducial markers 170 on patient support 110 and calculate the movements necessary to properly align the central axis 220 of center opening 125 of scanner 105 with the central axis 225 of scanboard 215 (as seen in FIG. 27). See FIG. 19, which shows an exemplary screenshot of display screen 210 when computing system 165 has been initiated, and alignment camera 155 is being used to locate fiducial markers 170. Note that if computing system 165 is unable to locate fiducial markers 170 (e.g., because the fiducial markers 170 are disposed out of the field of view of alignment camera 155), computing system 165 is configured to inform the user and to prompt the user to re-initiate computing system 165. See FIG. 20, which shows an exemplary screenshot of display screen 210 when computing system 165 has been initiated but has not been able to locate fiducial markers 170.

Figure 21:
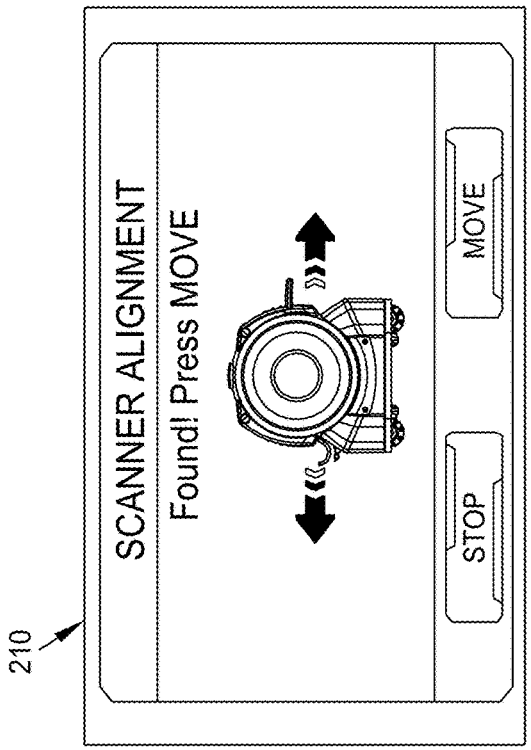
Figure 23:
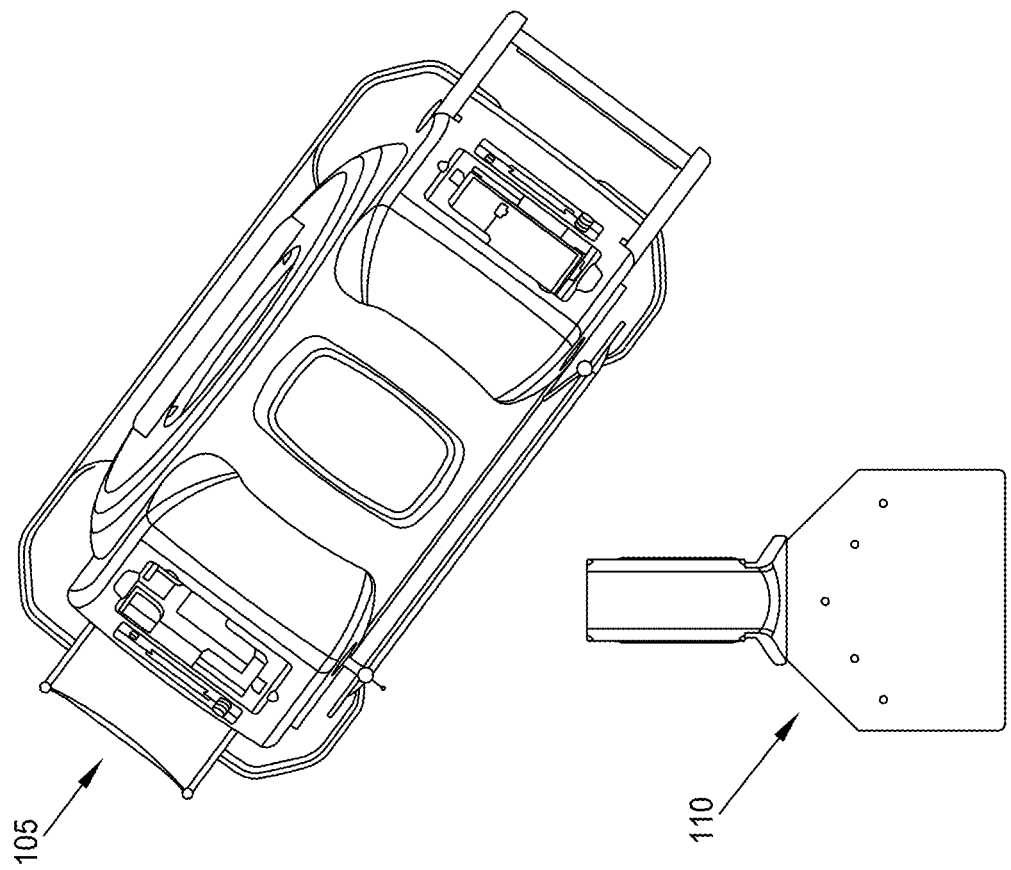
FIG. 23 is a schematic view showing misalignment between a medical scanner and a patient support formed in accordance with the present invention which may result in the exemplary view of FIG. 22.
Figure 22:
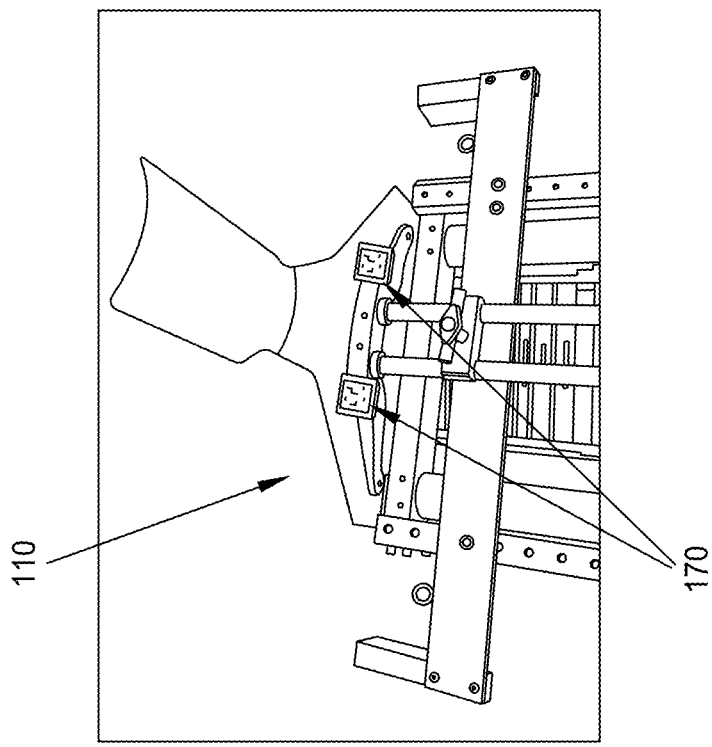
FIG. 22 is a schematic view of an exemplary view obtained by the novel scanner alignment system of FIG. 13.

Once recon computer 180 of computing system 165 has located the fiducial markers 170 disposed on patient support 110 via alignment camera 155, software subcomponent ("NLCamNav") 190 sends data concerning (i) the angular displacement of scanner 105 relative to patient support 110, and (ii) the distance between scanner 105 and patient support 110 to controller 195. Computing system 165 displays information on display screen 210 to inform the user that fiducial markers 170 have been identified and computing system 165 is prepared to move scanner 105 as appropriate. See FIG. 21, which shows an exemplary screenshot of display screen 210 when computing system 165 has been initiated and has located fiducial markers 170. See also FIG. 22, which shows an exemplary image of fiducial markers 170 as seen by alignment camera 155, and FIG. 23 which is an exemplary top-down view showing how scanner 105 may be angled relative to patient support 110 when fiducial markers 170 are located by recon computer 180 of computing system 165, requiring movement of scanner 105 in order to properly align central axis 220 of center opening 125 of scanner 105 with central axis 225 of scanboard 215 of patient support 110.

Figure 24:
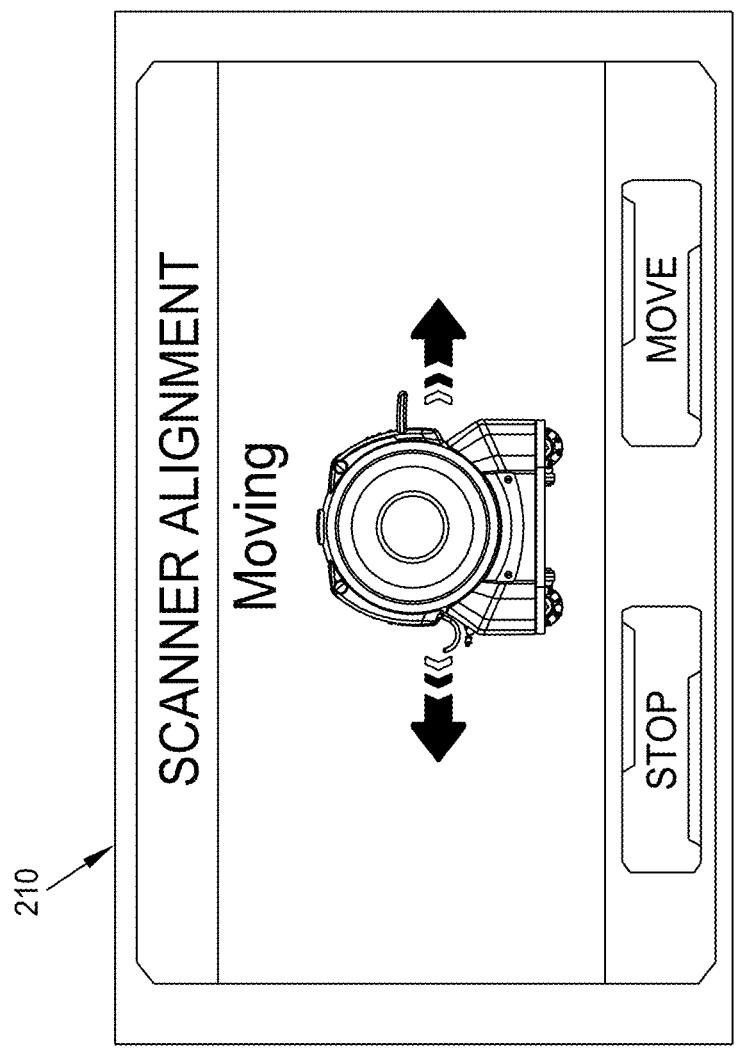
FIG. 24 is an exemplary screenshot from the novel computing system of FIG. 16 which may be displayed to a user when the medical scanner is being moved by the novel scanner alignment system of the present invention.

Once the user has confirmed that computing system 165 should proceed to initiate appropriate movement of scanner 105 (e.g., by pressing the digital 'Move' button displayed to the user on touchscreen display screen 210) to achieve proper alignment, computing system 165 uses data received from software subcomponent ("NLCamNav") 190 to cause controller 195 to instruct software subcomponent ("Trio") 205 to effect appropriate movement of scanner 105 relative to patient support 110 using transport mechanism 130. See FIG. 24, which shows an exemplary screenshot of display screen 210 when scanner 105 is being moved by transport mechanism 130. It will be appreciated that, if desired, computing system 165 may be configured to simultaneously monitor images provided by drive camera 160 so as to automatically stop movement of scanner 105 if an object (e.g., a person) is disposed between scanner 105 and support 110, whereby to ensure safe operation of novel scanner alignment system 100.

To this end, it will be appreciated that alignment camera 155 is configured to take images of fiducial markers 170 and computing system 165 (e.g., software subcomponent ("NLCamNav") 190 is configured to process the images using computer vision technology that will be apparent to one of skill in the art in view of the present disclosure. More particularly, software subcomponent ("NLCamNav") 190 of computing system 165 finds the location of fiducial markers 170 in the image obtained by alignment camera 155 and calculates how "offset" (i.e., out of alignment) scanner 105 is from the center of patient support 110. The required movements (i.e., the inverse of the offset) are then used to generate the appropriate movement commands that are communicated to transport assembly 130 (e.g., to either or both of gross movement mechanism 135 and fine movement mechanism 140). Computing system 165 provides commands to move scanner 105 into position so that fiducial markers 170 are centered in the camera's view, and hence center opening 125 of scanner 105 is properly aligned with patient support 110.

Figure 25:
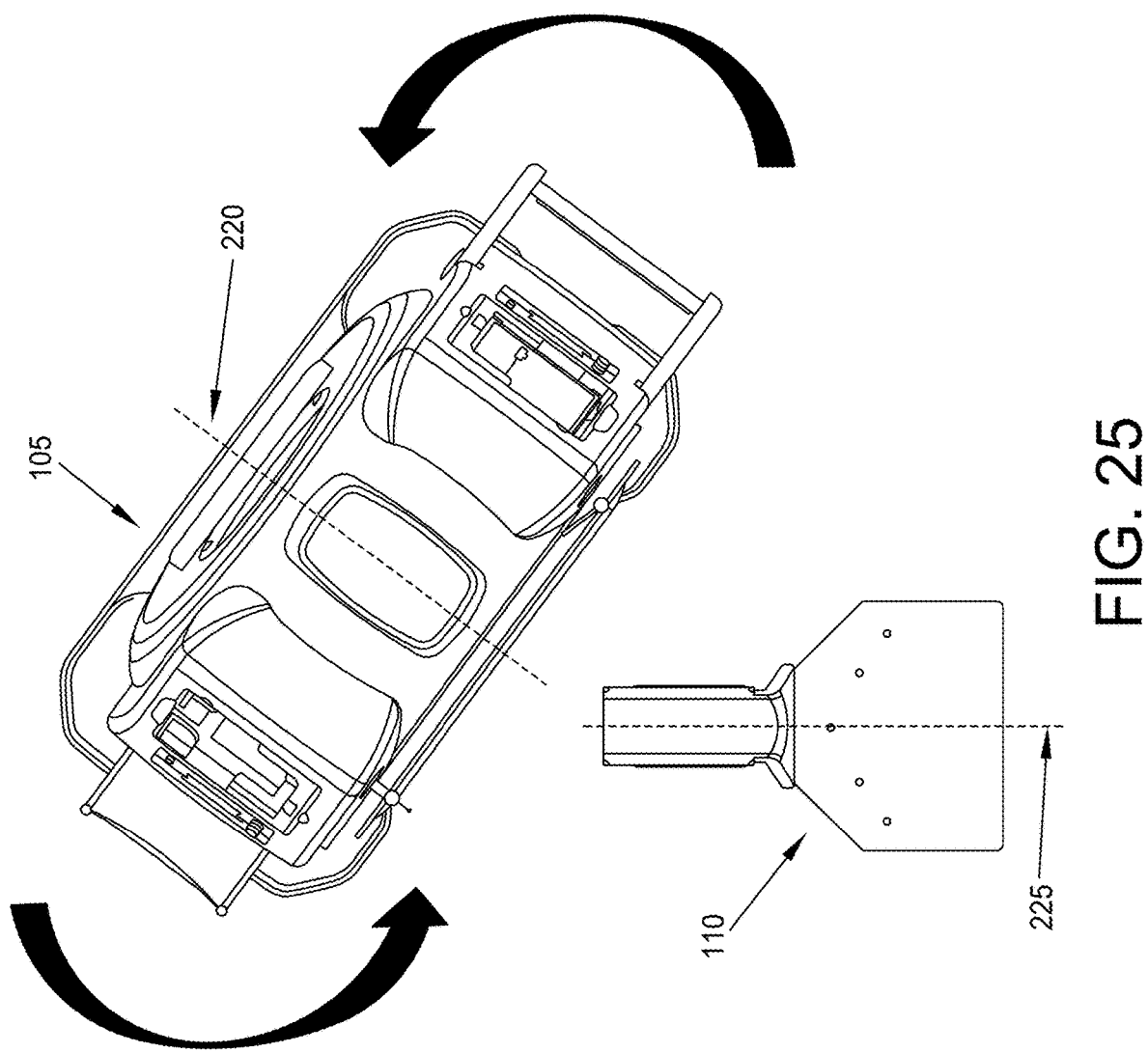
FIGS. 25-27 are schematic views showing how the novel scanner alignment system of the present invention may be used to align a medical scanner with a patient support.
Figure 26:
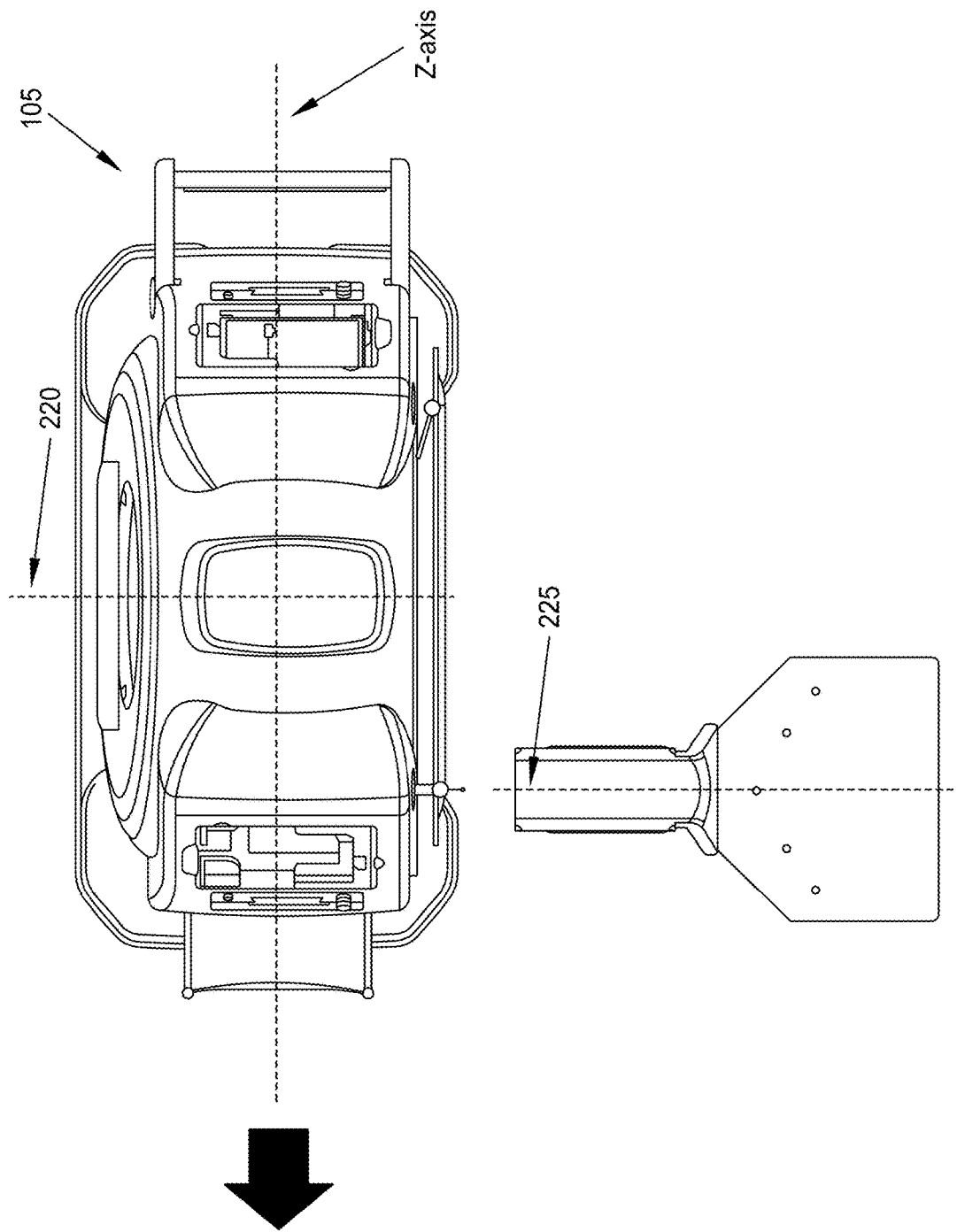

See, for example, FIGS. 25-27, which show how computing system 165 causes a scanner 105 that is misaligned with the desired scan axis (i.e., central axis 225) of scanboard 215 of patient support 110 to (i) rotate scanner 105 relative to patient support 110 (FIG. 25), and (ii) move scanner 105 longitudinally along the X-axis (i.e., towards or away) or laterally along the Z-axis (i.e., left or right) (FIG. 26), whereby to align the central axis 220 of center opening 125 of scanner 105 with the central axis 225 of scanboard 215 of patient support 110 (FIG. 27).

It will be appreciated that, when operating novel scanner alignment system 100, it is preferable that gross movement mechanism 135 be utilized in order to move scanner 105 to align scanner 105 with patient support 110 and fine movement mechanism 140 be used to move scanner 105 during scanning, however, if desired, fine movement mechanism 140 may be utilized to align scanner 105 with patient support 110, or both gross movement mechanism 135 and fine movement mechanism 140 may be utilized to align scanner 105 with patient support 110, without departing from the scope of the present invention. Note also that to the extent that scanner 105 comprises controls (e.g., a "drive bar") for permitting a user to utilize gross movement mechanism 135 to move scanner 105, such controls are preferably locked/deactivated when scanner alignment system 100 is being utilized. Furthermore, if desired, the user may interrupt/cancel movement of scanner 105 under the direction of scanner alignment system 100 at any time (e.g., by pressing an appropriate control button on touchscreen display screen 210, as will be apparent to one of skill in the art in view of the present disclosure). Additionally, while the view obtained from alignment camera 155 is normally used only by computing system 165 to calculate appropriate alignment parameters to move scanner 105 relative to patient support 110, it should be appreciated that, if desired, the image obtained from alignment camera 155 may be displayed to the user (e.g., on display screen 210) so as to facilitate troubleshooting in instances where scanner alignment system 100 is unable to locate the one or more fiducial sensors 170 located on patient support 110.

It will also be appreciated that, where scanner alignment system 100 is utilized to both rotate and move scanner 105 relative to a stationary patient support 110, in one preferred embodiment of the invention, the first movement of scanner 105 is preferably a rotation movement to rotate scanner 105 so that scan side 145 extends perpendicular to central axis 225 of scanboard 215 patient support 110 and the second movement is preferably movement along the Z-axis to align central axis 220 of center opening 125 (i.e., the scan axis) with the central axis 225 of scanboard 215.

Figure 28:
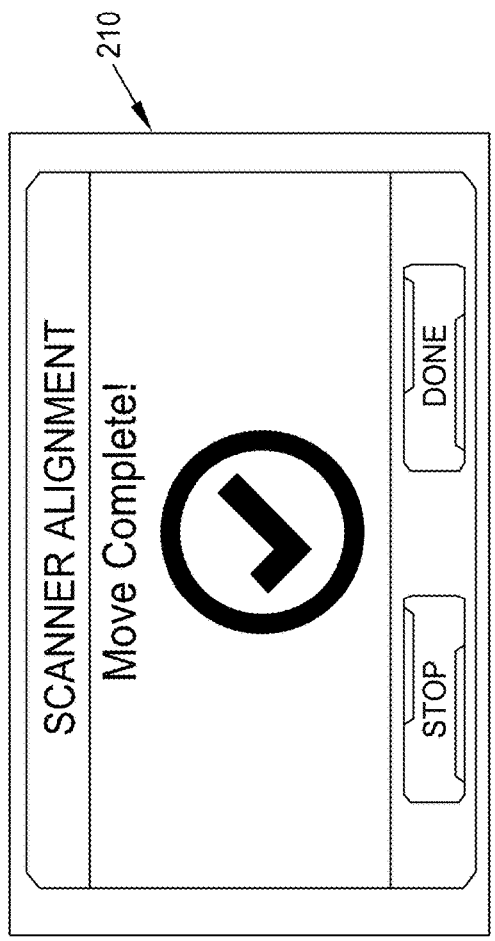
FIGS. 28 and 29 are exemplary screenshots from the novel computing system of FIG. 16 showing exemplary confirmatory messages that may be displayed to a user when the medical scanner and patient support are in proper alignment.
Figure 29:
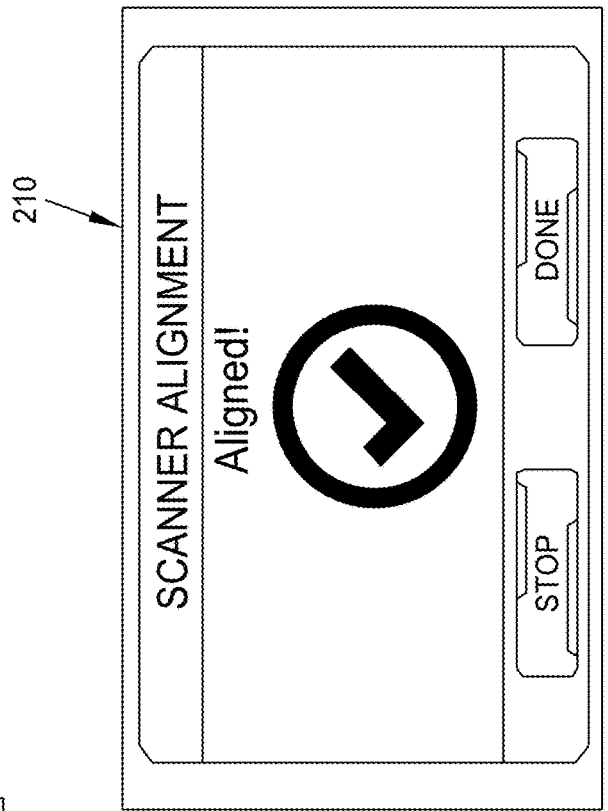

Once movement of scanner 105 is completed by scanner alignment system 100, in one preferred form of the invention, display screen 210 displays an appropriate message to the user to indicate that movement is complete. See FIG. 28. The user can then perform a "visual check" to ensure the alignment accuracy, i.e., by looking to see that central axis 220 of center opening 125 is aligned with central axis 225 of scanboard 215. See FIG. 29. Note that if the user determines that alignment is not satisfactory, the user can use scanner alignment system 100 again in order to increase the alignment accuracy.

Exemplary Operating Bounds for Scanner Alignment System 100

In one preferred form of the invention, the operating bounds for operation of scanner alignment system 100 are as follows:

Scanner 105 should be no closer than 300 mm from scanboard 215, and no farther than 600 mm from scanboard 215, and center opening 125 of scanner 105 should not be farther than 200 mm from the center of scanboard 215.

Figure 30:
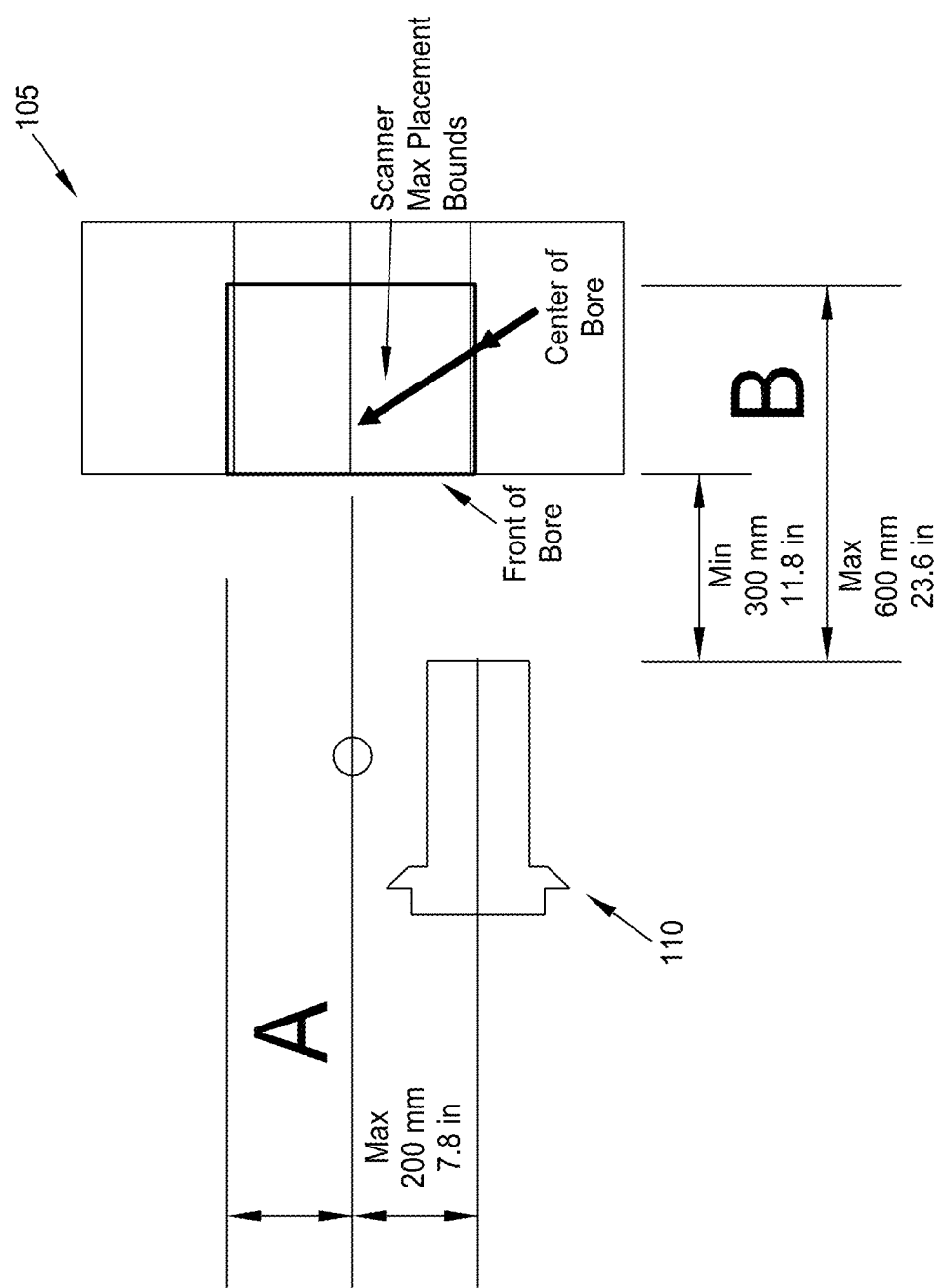
FIG. 30 is a schematic view showing exemplary movement distances of a medical scanner relative to a patient support when the novel scanner alignment system of the present invention is used to align the medical scanner with the patient support.

See FIG. 30, wherein the aforementioned limits are shown along the Z-axis and X-axis, respectively, and labeled A and B, respectively.

Note that these recommended limits are selected to ensure safe operation of alignment system 100 in an exemplary embodiment of the invention only, and do not represent technical limitations of alignment system 100.

Application of Novel Scanner Alignment System 100 to Prior Art Scanners and Computer Controls/Methods for Operating Prior Art Scanners It will be appreciated that it is possible to modify prior art mobile medical scanners having powered drive units (such as are discussed above), and to modify prior art patient supports (such as are discussed above) to incorporate the novel scanner alignment system 100 of the present invention.

The particular computer controls provided for a particular medical scanner will vary according to the functionality of the medical scanner.

Figure 1:
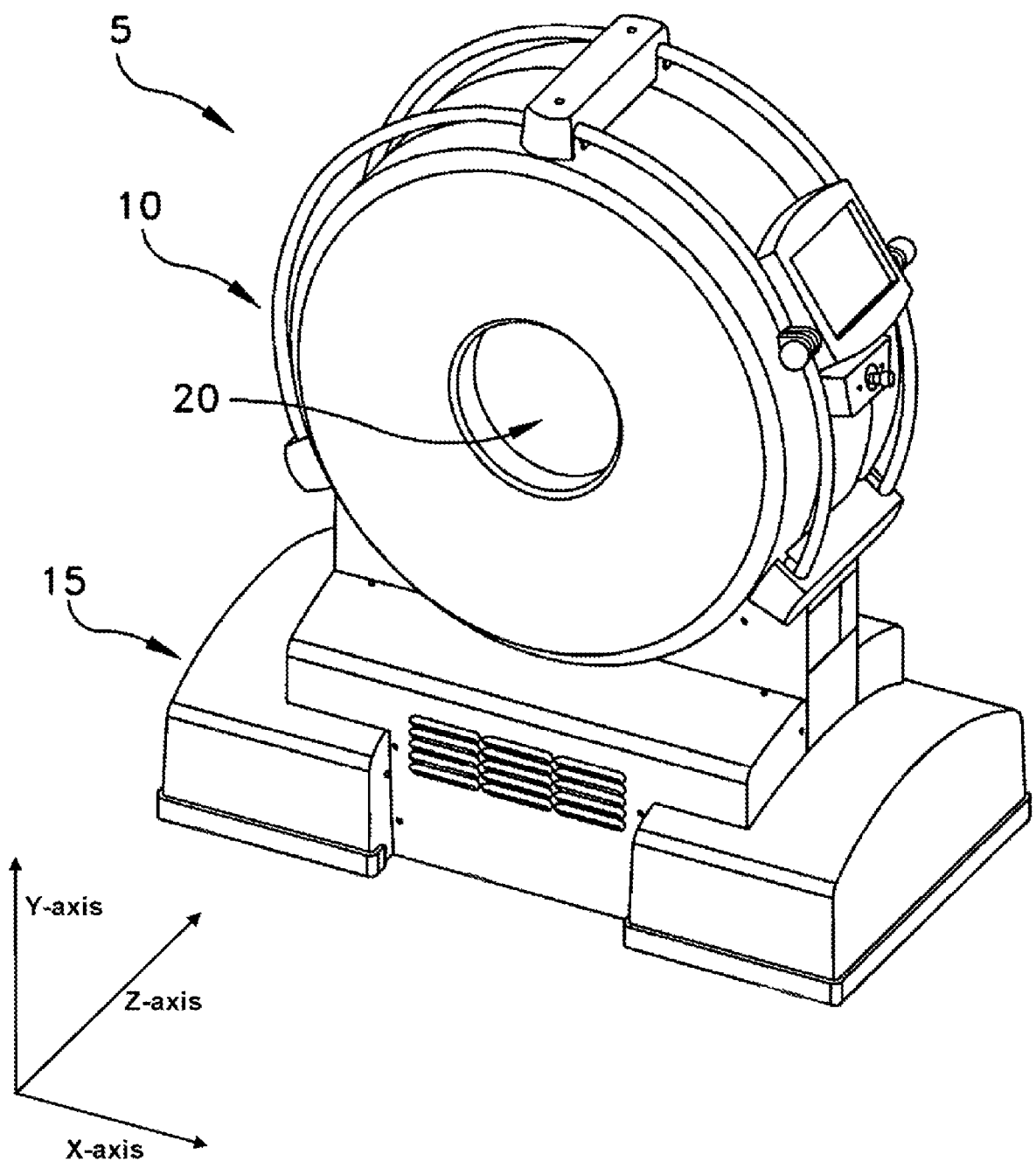
FIGS. 1 and 2 are schematic views showing the exterior of an exemplary CT imaging system.
Figure 2:
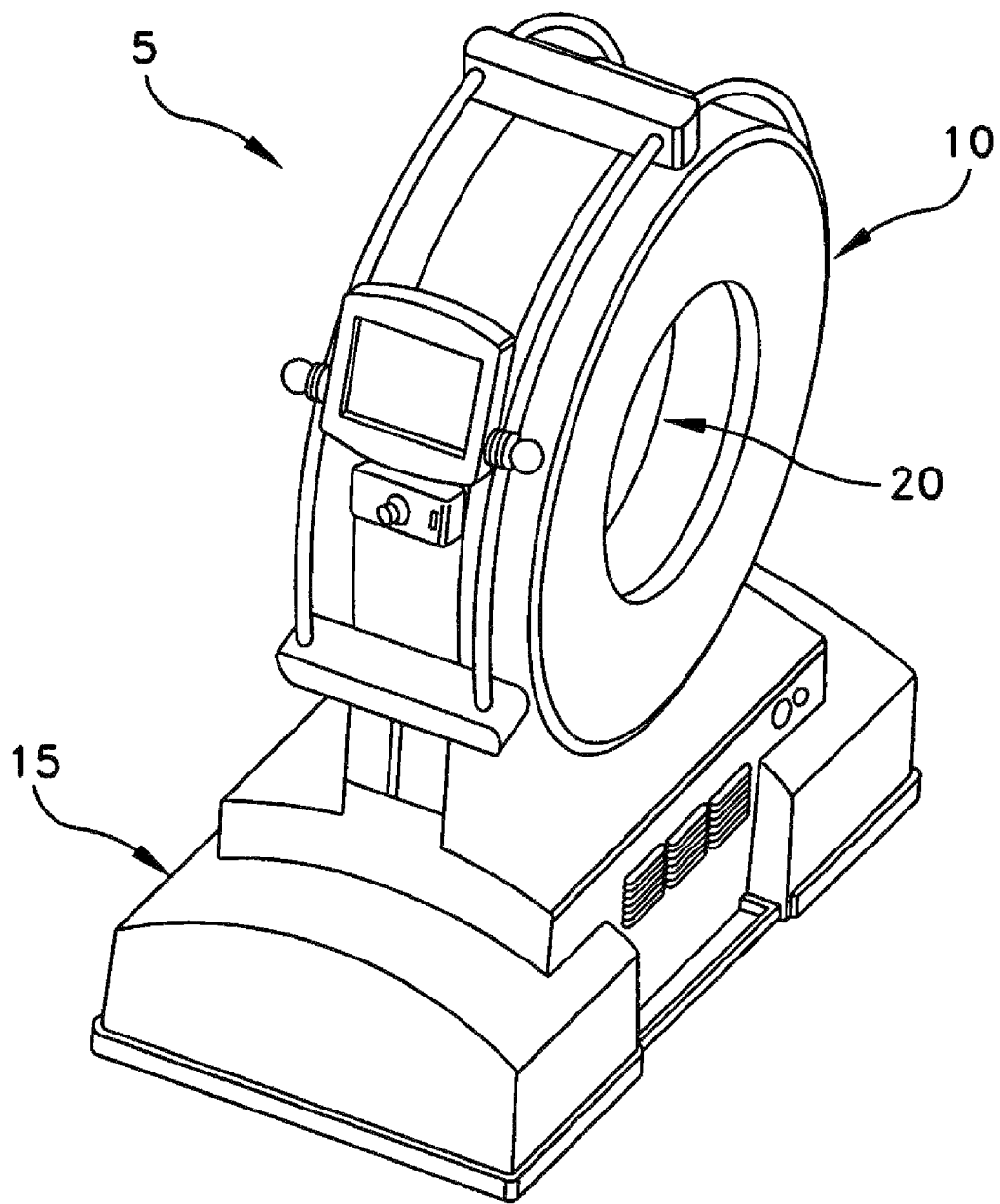
Figure 3:
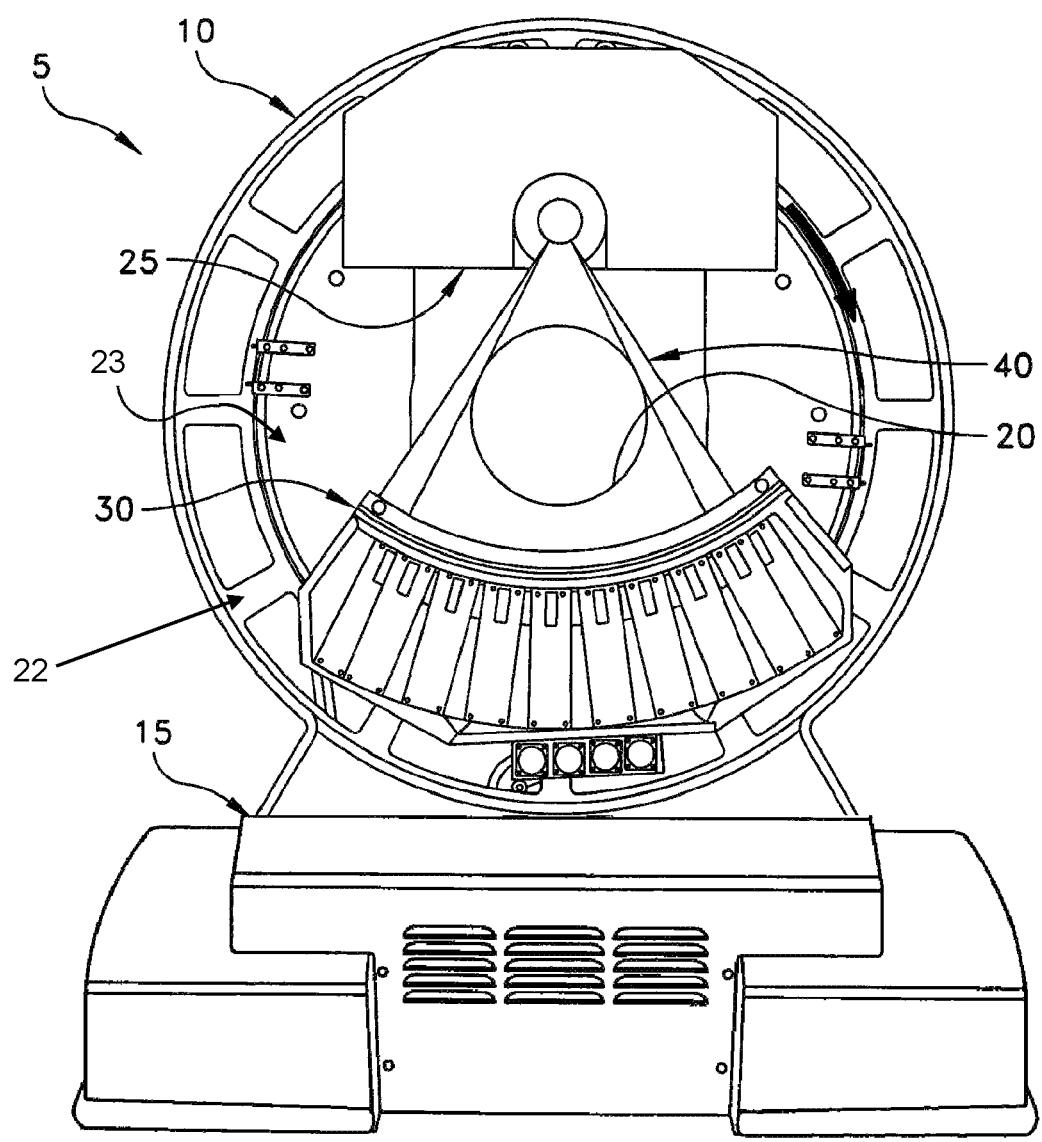
FIG. 3 is a schematic view showing various components in the torus of the exemplary CT imaging system shown in FIGS. 1 and 2.
Figure 31:
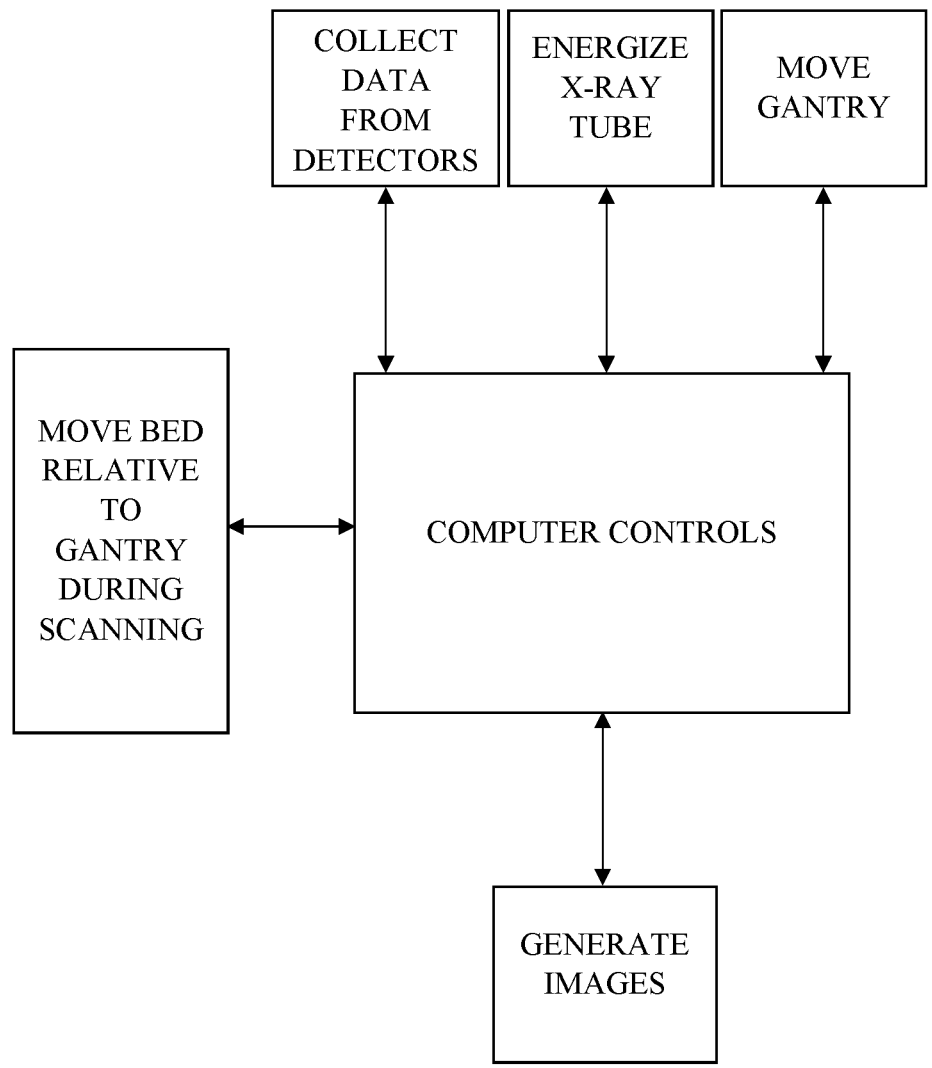
FIGS. 31-36 show aspects of the control systems of various prior art scanners which may be supplemented by the novel scanner alignment system of the present invention.

By way of example but not limitation, with the medical scanner shown in FIGS. 1-3, the computer controls may be of the type shown in FIG. 31, i.e., the computer controls are configured to control: moving the gantry, energizing the X-ray tube, and collecting data from the detectors; moving the bed relative to the gantry during scanning; and generating images from the data collected from the detectors.

Figure 4:
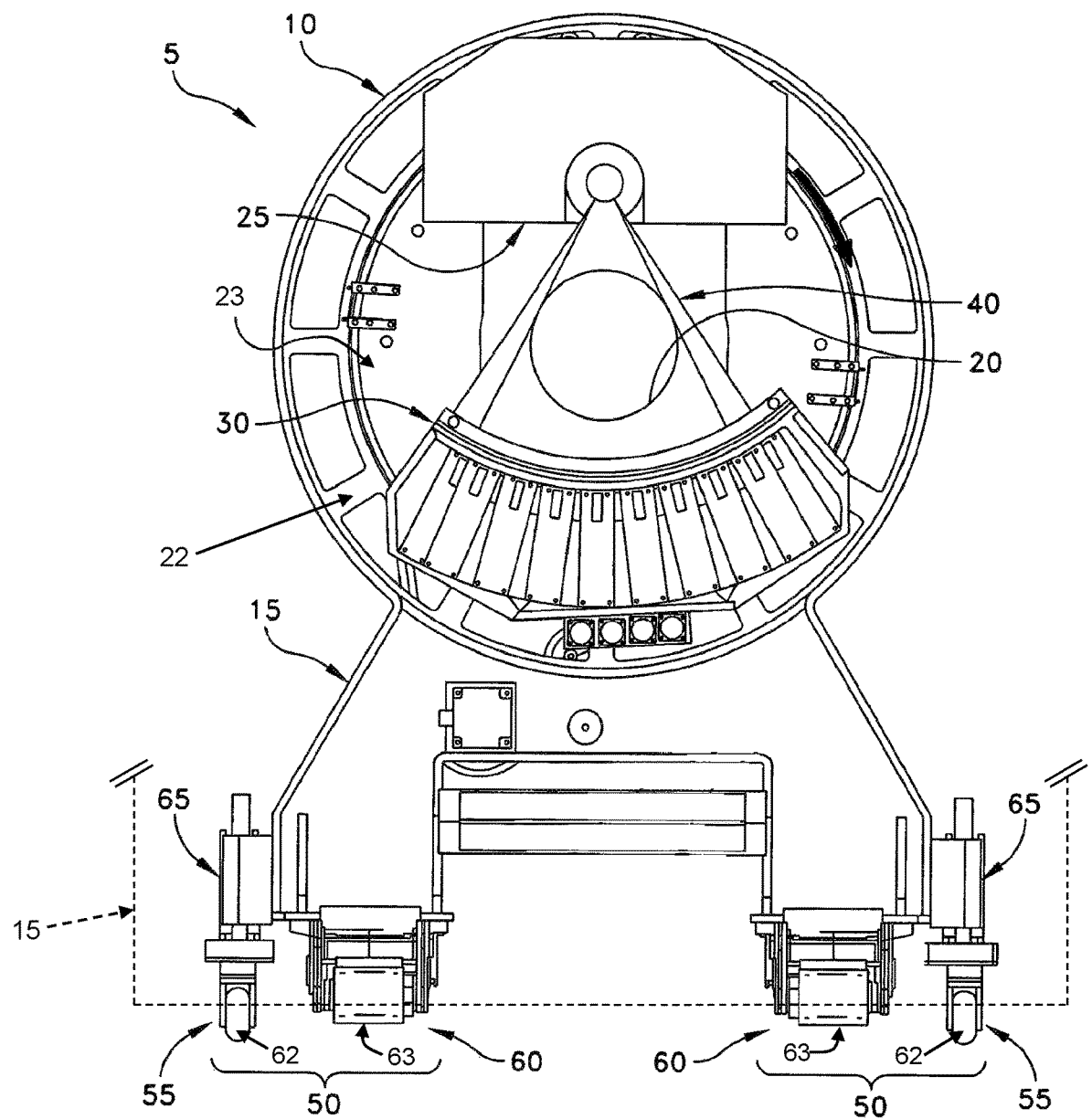
FIGS. 4 and 5 are schematic views showing an exemplary transport assembly for an exemplary mobile CT imaging system.
Figure 5:
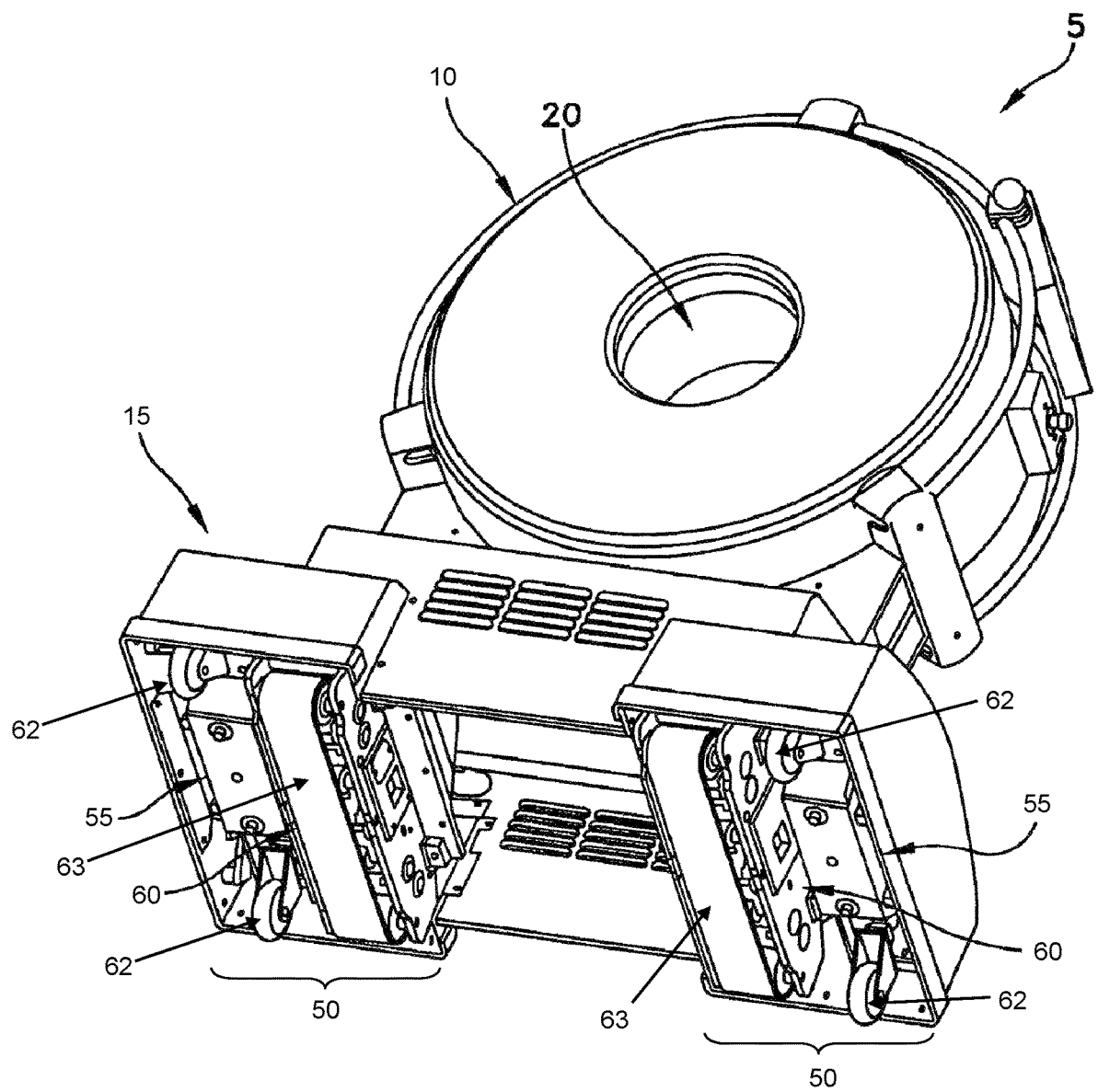
Figure 32:
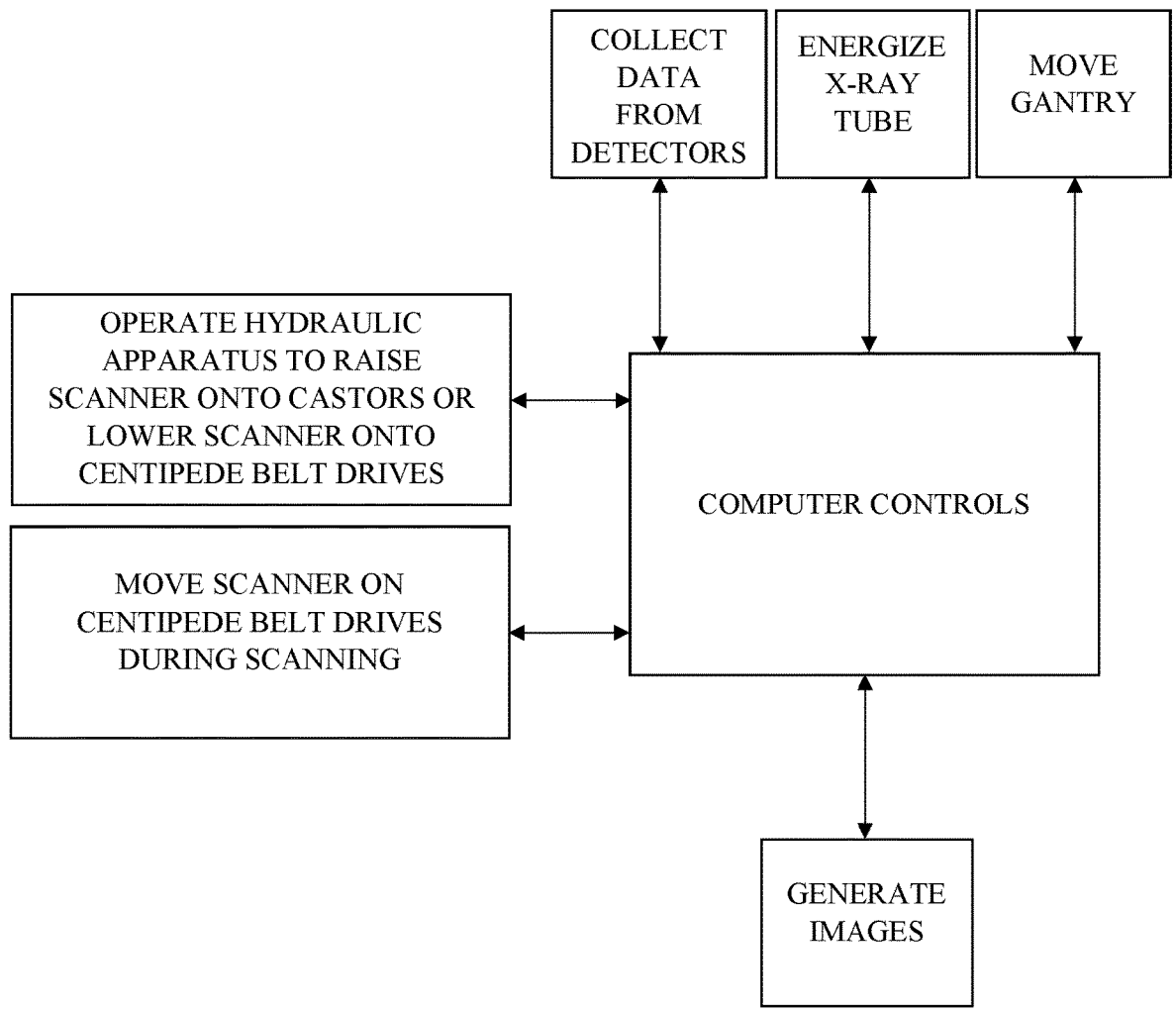

By way of further example but not limitation, with the mobile medical scanner shown in FIGS. 4 and 5, the computer controls may be of the type shown in FIG. 32, i.e., the computer controls are configured to control: moving the gantry, energizing the X-ray tube, and collecting data from the detectors; operating the hydraulic apparatus to raise the scanner onto castors or lower the scanner onto the centipede belt drives; operating the centipede belt drives to move the scanner during scanning; and generating images from the data collected from the detectors.

Figure 6:
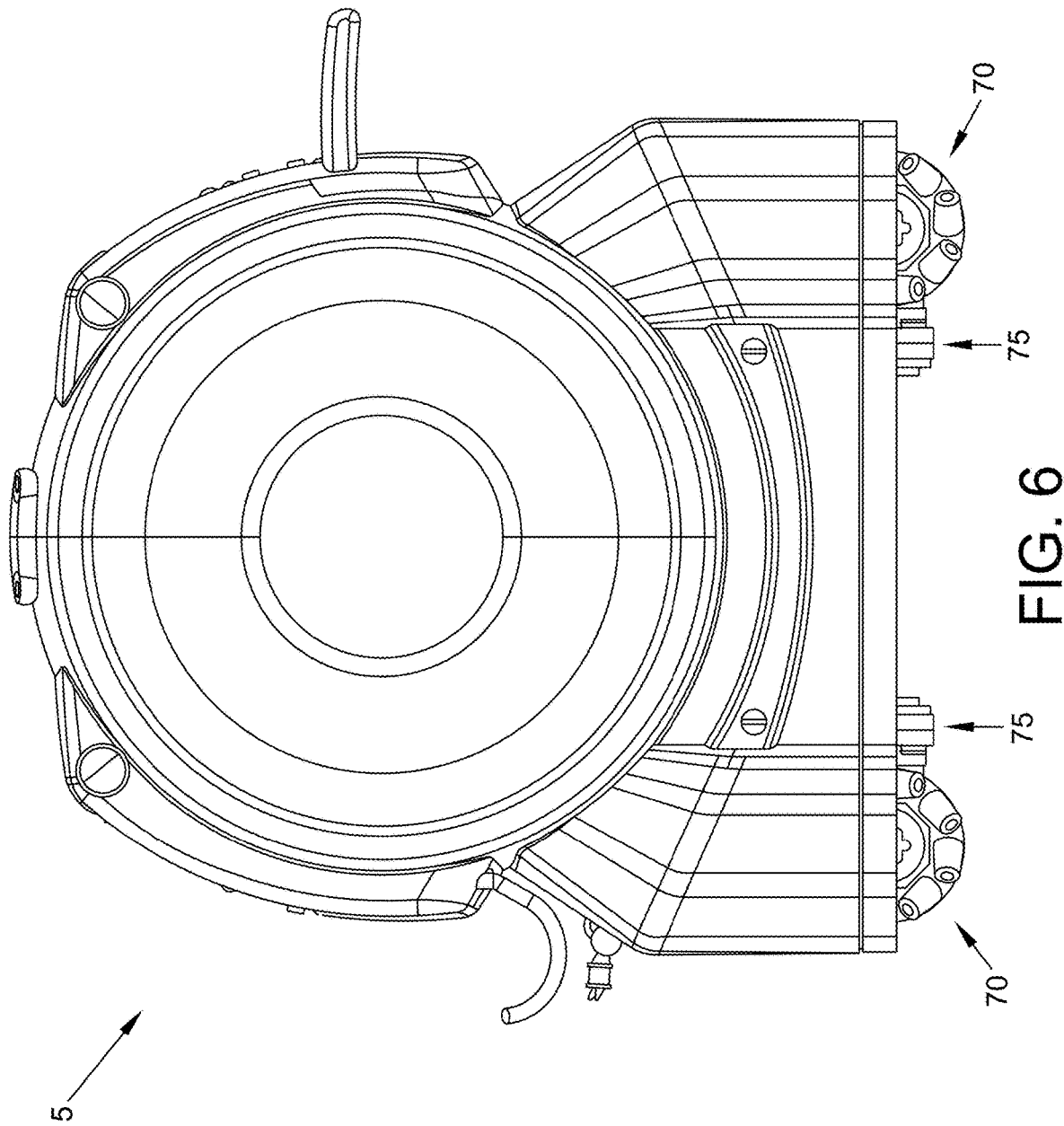
FIGS. 6 and 7 are schematic views showing another exemplary transport assembly for an exemplary mobile CT imaging system.
Figure 7:
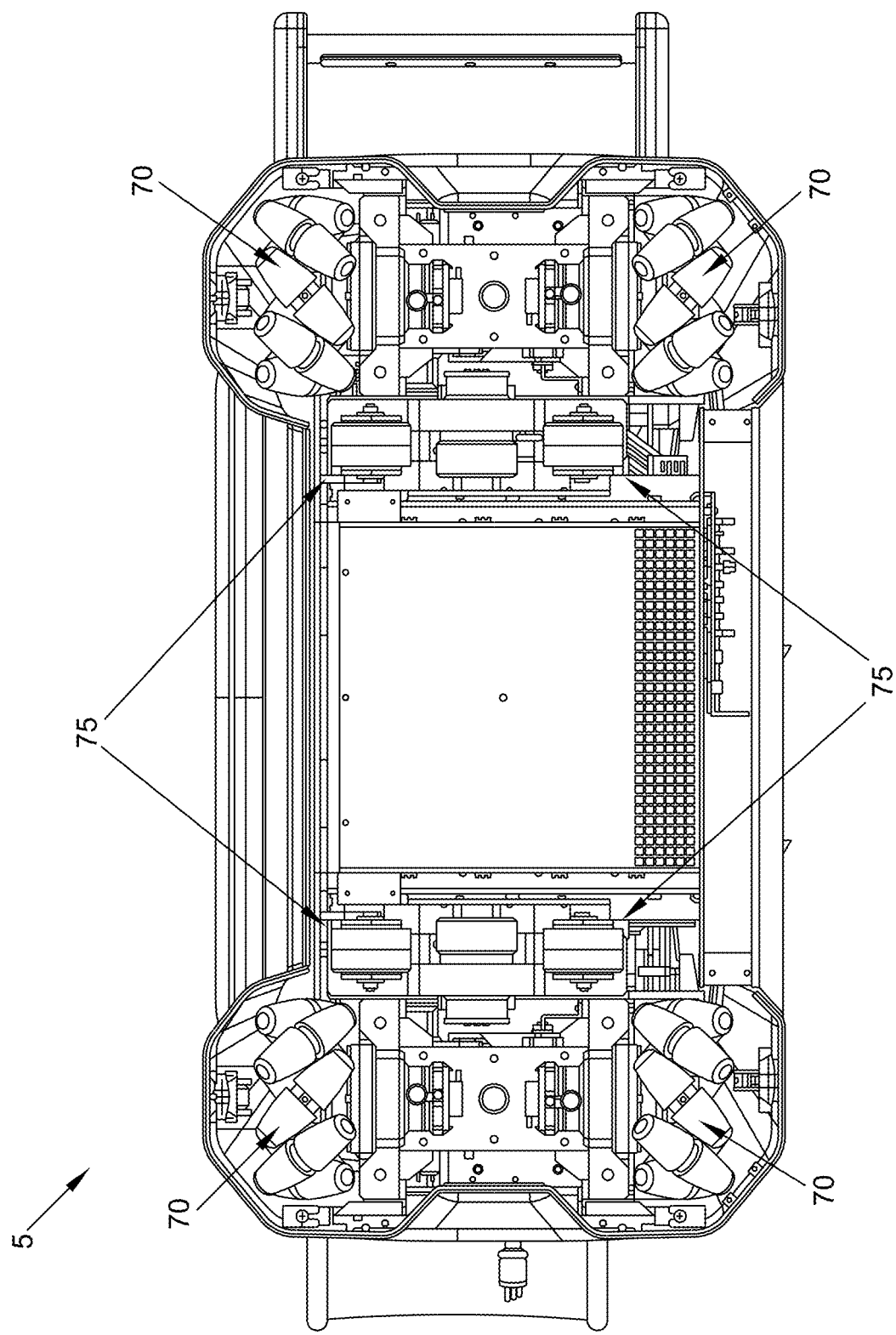
Figure 33:
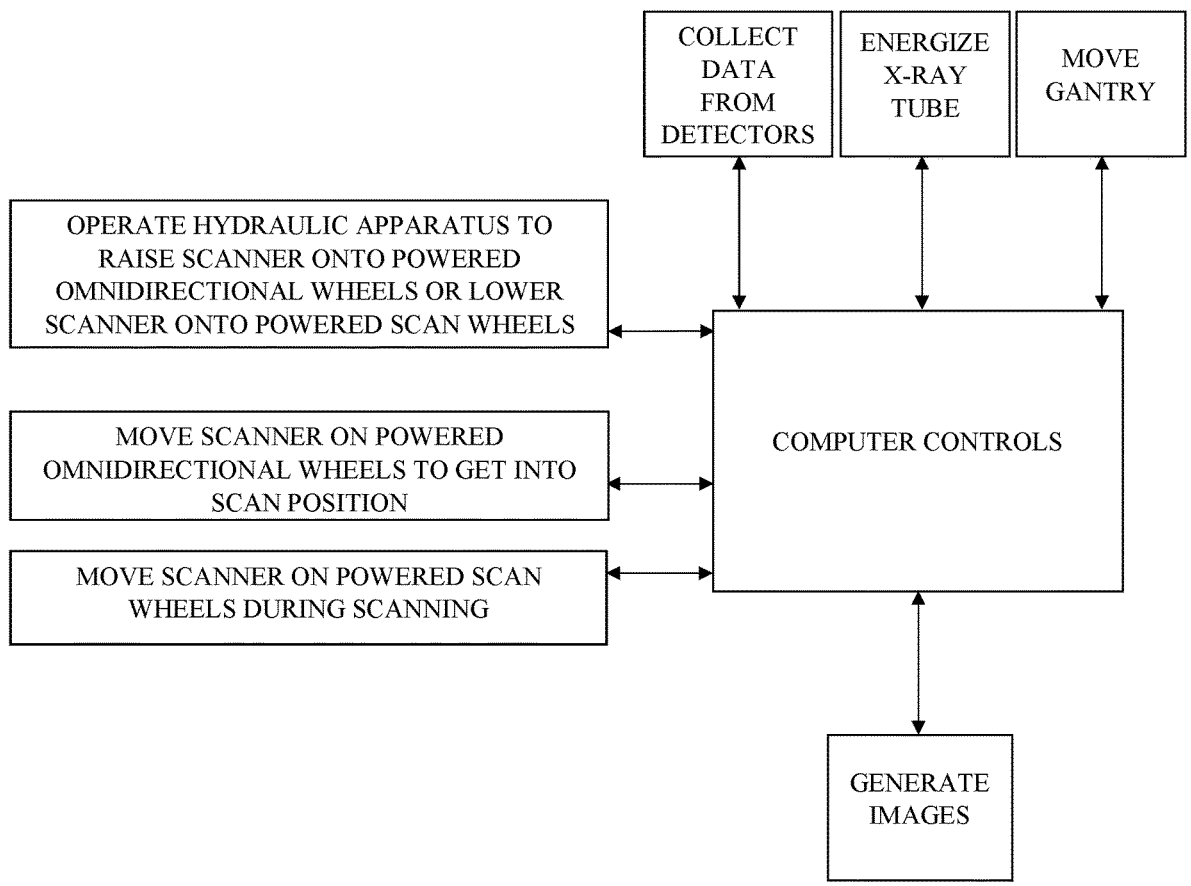

By way of further example but not limitation, with the mobile medical scanner shown in FIGS. 6 and 7, the computer controls may be of the type shown in FIG. 33, i.e., the computer controls are configured to control: moving the gantry, energizing the X-ray tube, and collecting data from the detectors; and operating the hydraulic apparatus to raise the scanner onto powered omnidirectional wheels (e.g., so-called "mecanum wheels", "omni wheels" or "ilon wheels", etc.) or lower the machine onto the powered scan wheels; operating the powered omnidirectional wheels to move the scanner between scanning locations; operating the powered scan wheels to move the scanner during scanning; and generating images from the data collected from the detectors.

Figure 7B:
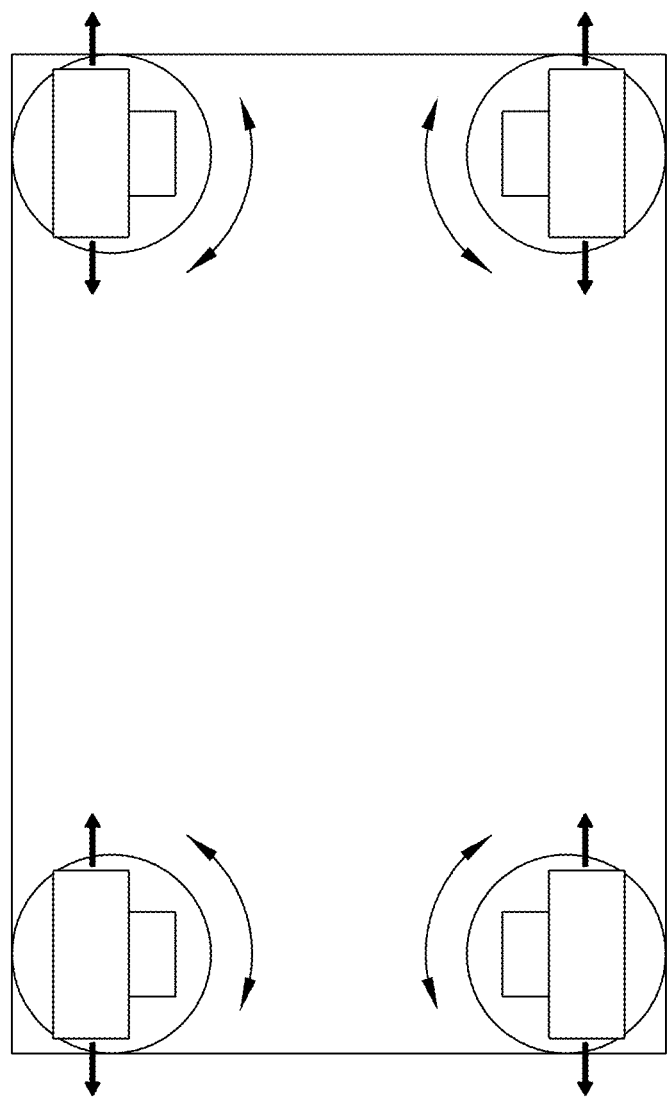
Figure 8:
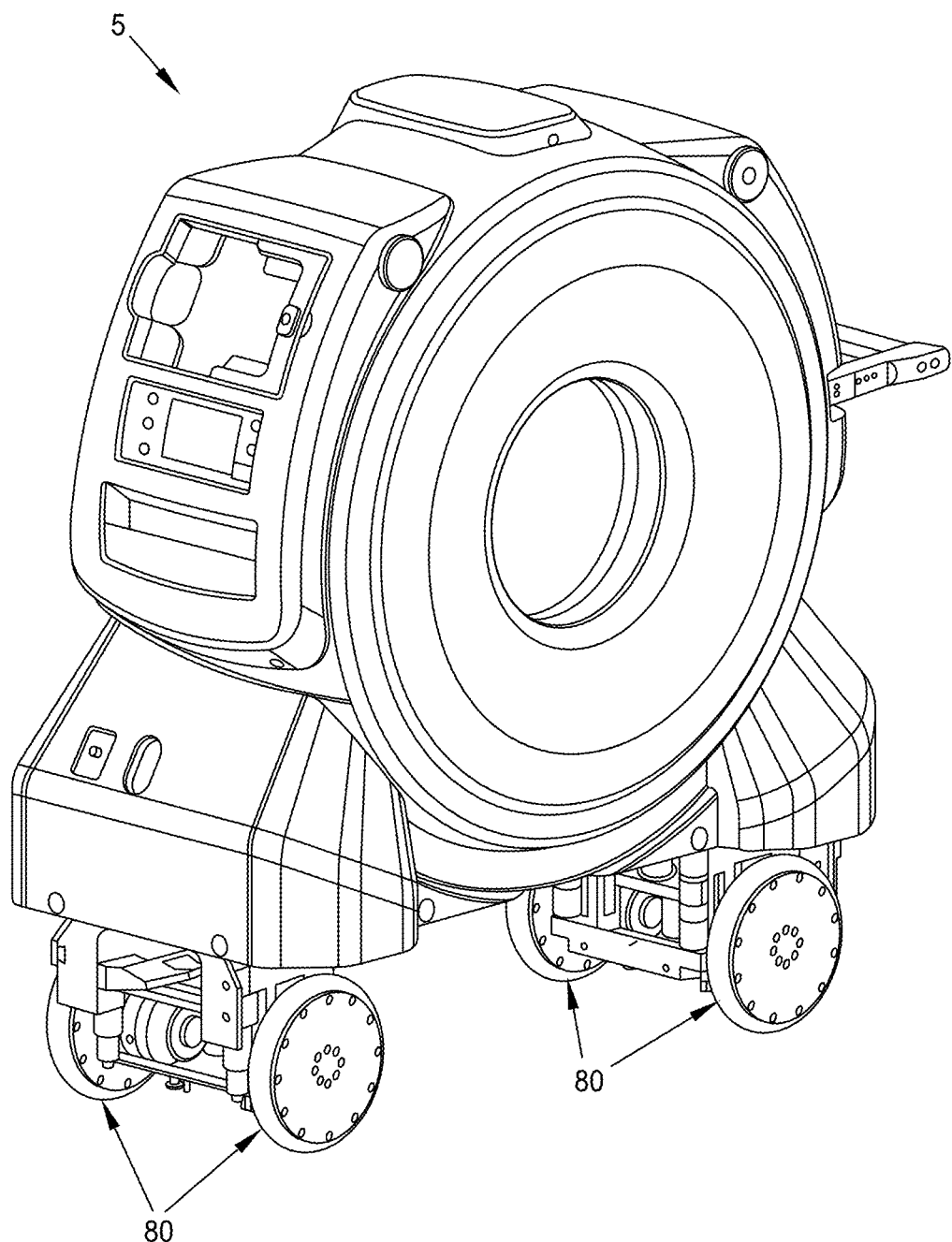
FIGS. 8 and 9 are schematic views showing yet another exemplary transport assembly for an exemplary mobile CT imaging system.
Figure 9:
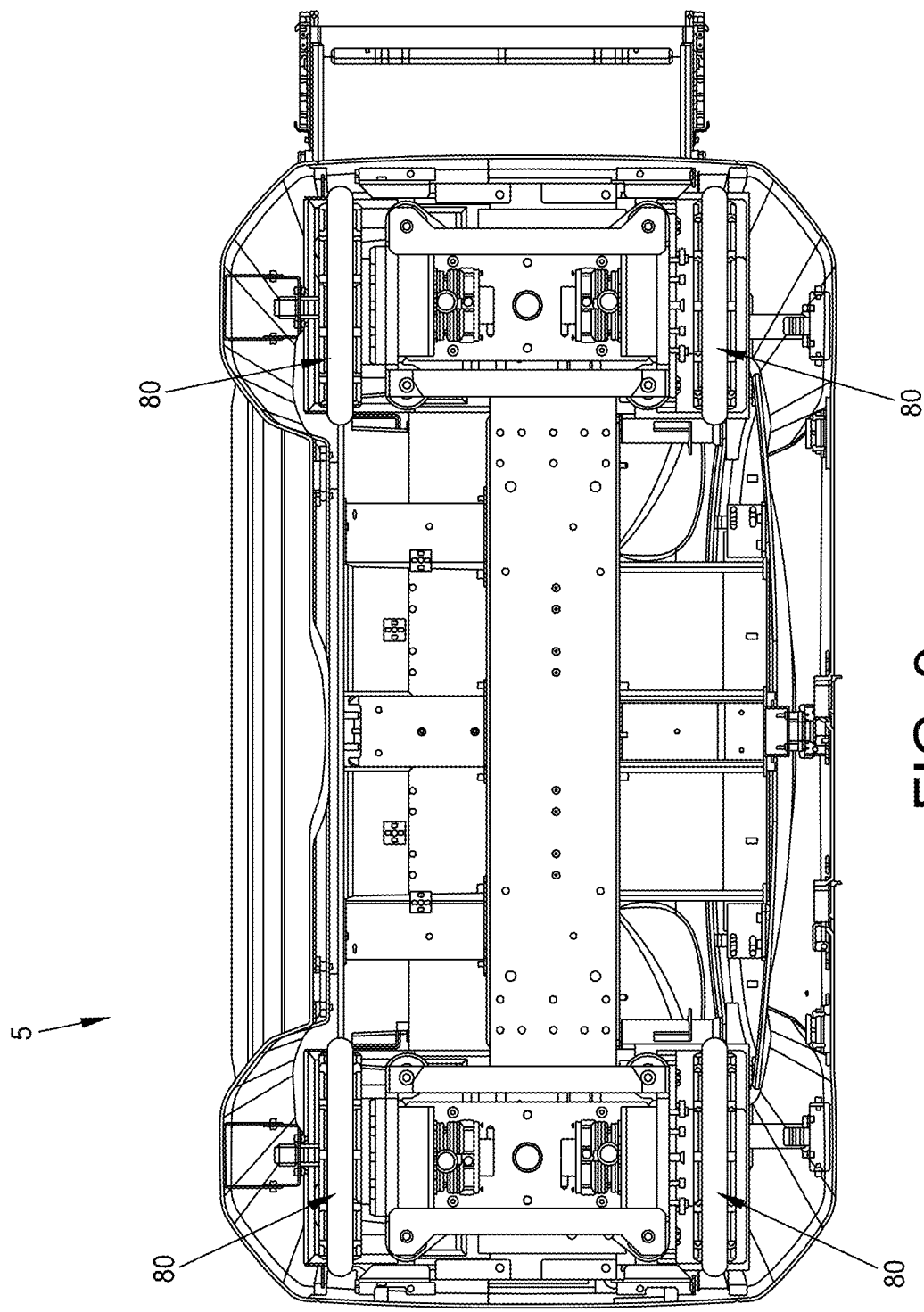
Figure 34:
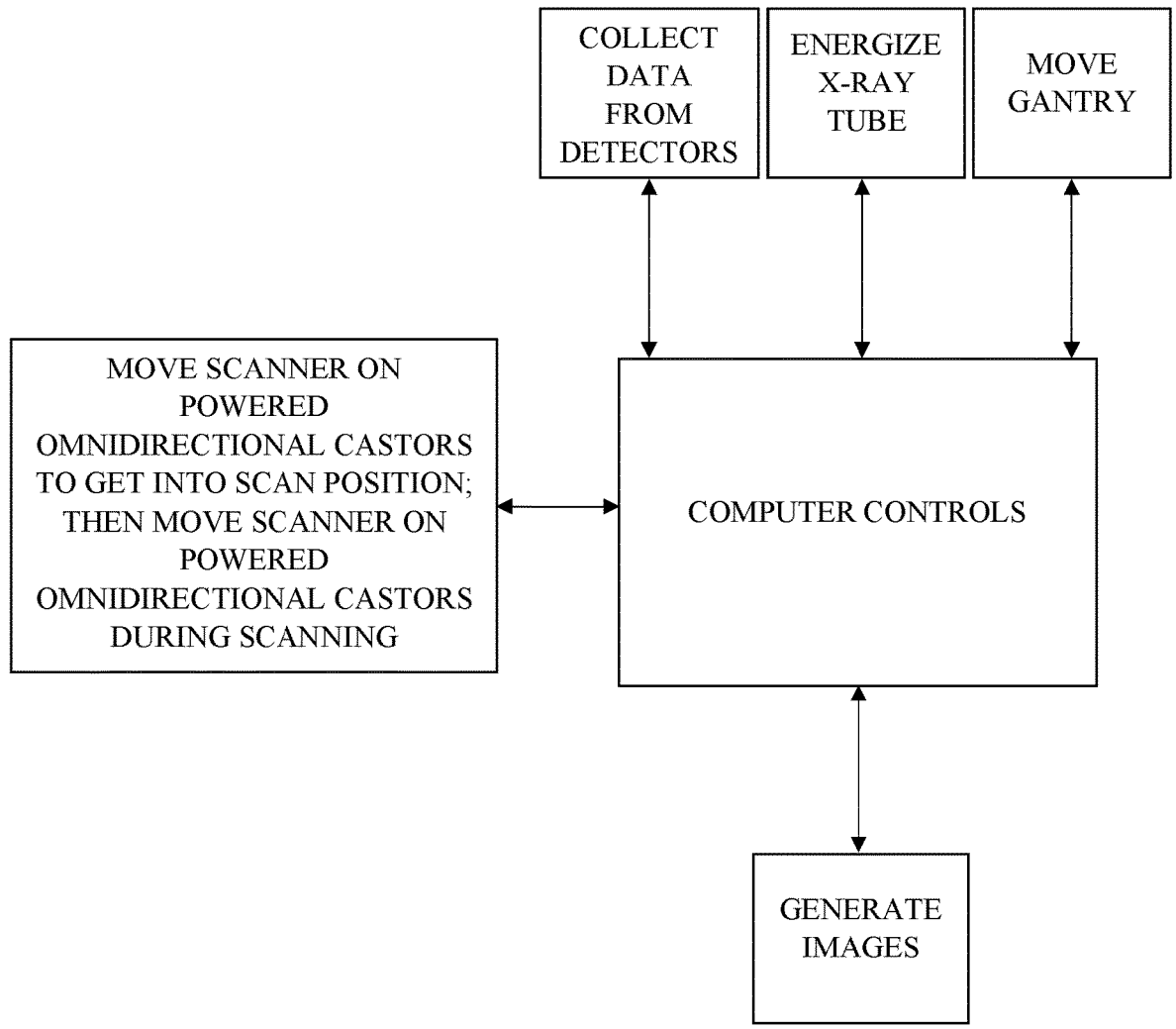

By way of still further example but not limitation, with the mobile medical scanner shown in FIGS. 7A and 7B, the computer controls may be of the type shown in the following FIG. 34, i.e., the computer controls are configured to control: moving the gantry, energizing the X-ray tube, and collecting data from the detectors; operating the powered omnidirectional castors to move the scanner between scanning locations; operating the powered omnidirectional castors to move the scanner during scanning; and generating images from the data collected from the detectors.

Figure 35:
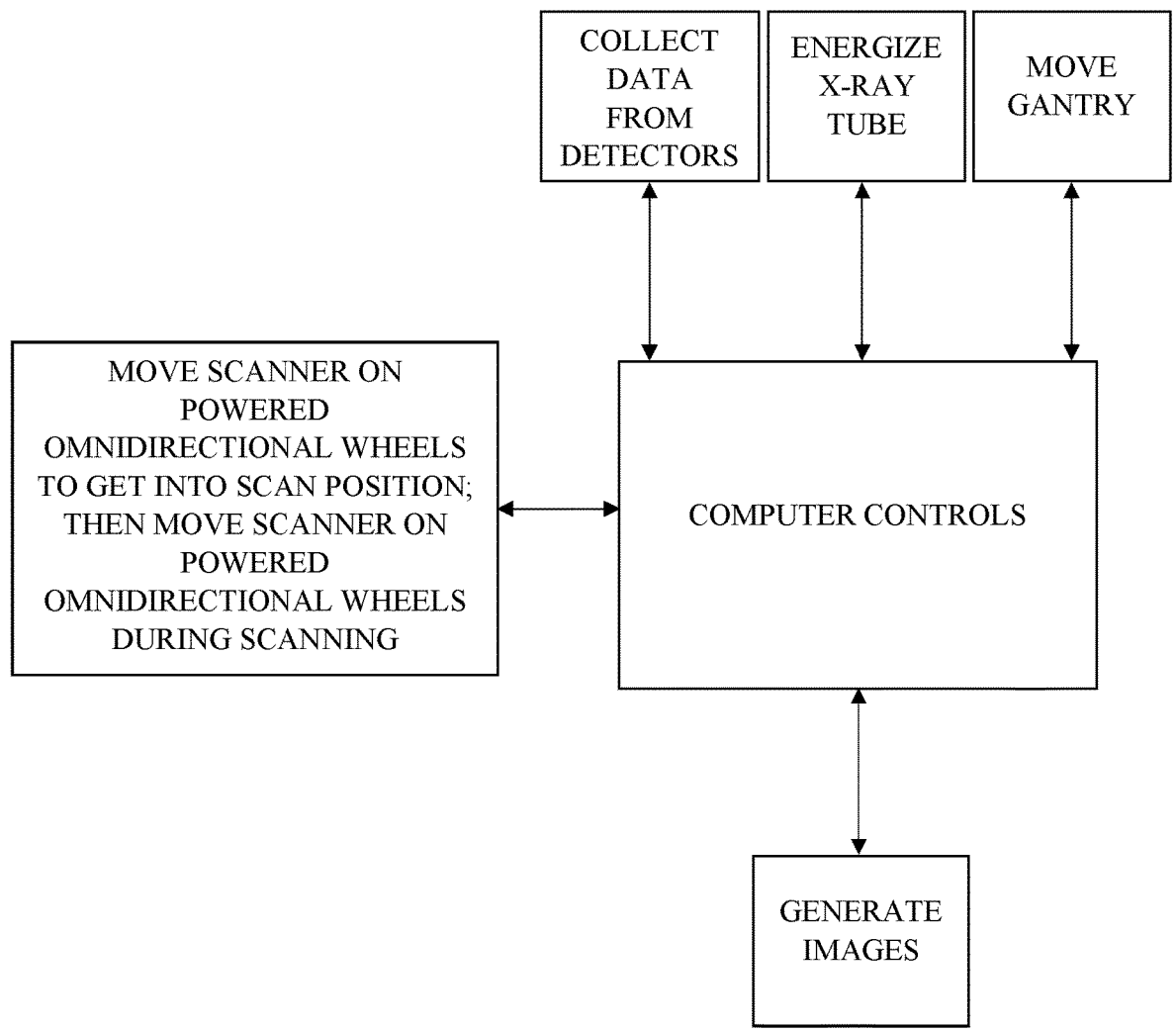

By way of still further example but not limitation, with the mobile medical scanner shown in FIGS. 8-14 of U.S. Pat. No. 11,369,326, issued Jun. 28, 2022 to NeuroLogica Corporation, a subsidiary of Samsung Electronics Co., Ltd. for MOBILE ANATOMICAL IMAGING SYSTEM WITH IMPROVED MOVEMENT SYSTEM COMPRISING LIDDIARD WHEELS Ser. No. 16/895,257, the computer controls may be of the type shown in the following FIG. 35, i.e., the computer controls are configured to control: moving the gantry, energizing the X-ray tube, and collecting data from the detectors; operating the powered omnidirectional wheels (e.g., so-called "mecanum wheels", "omni wheels" or "ilon wheels", etc.) to move the scanner between scanning locations; operating the powered omnidirectional wheels (e.g., so-called "mecanum wheels", "omni wheels" or "ilon wheels", etc.) to move the scanner during scanning; and generating images from the data collected from the detectors.

Figure 10:
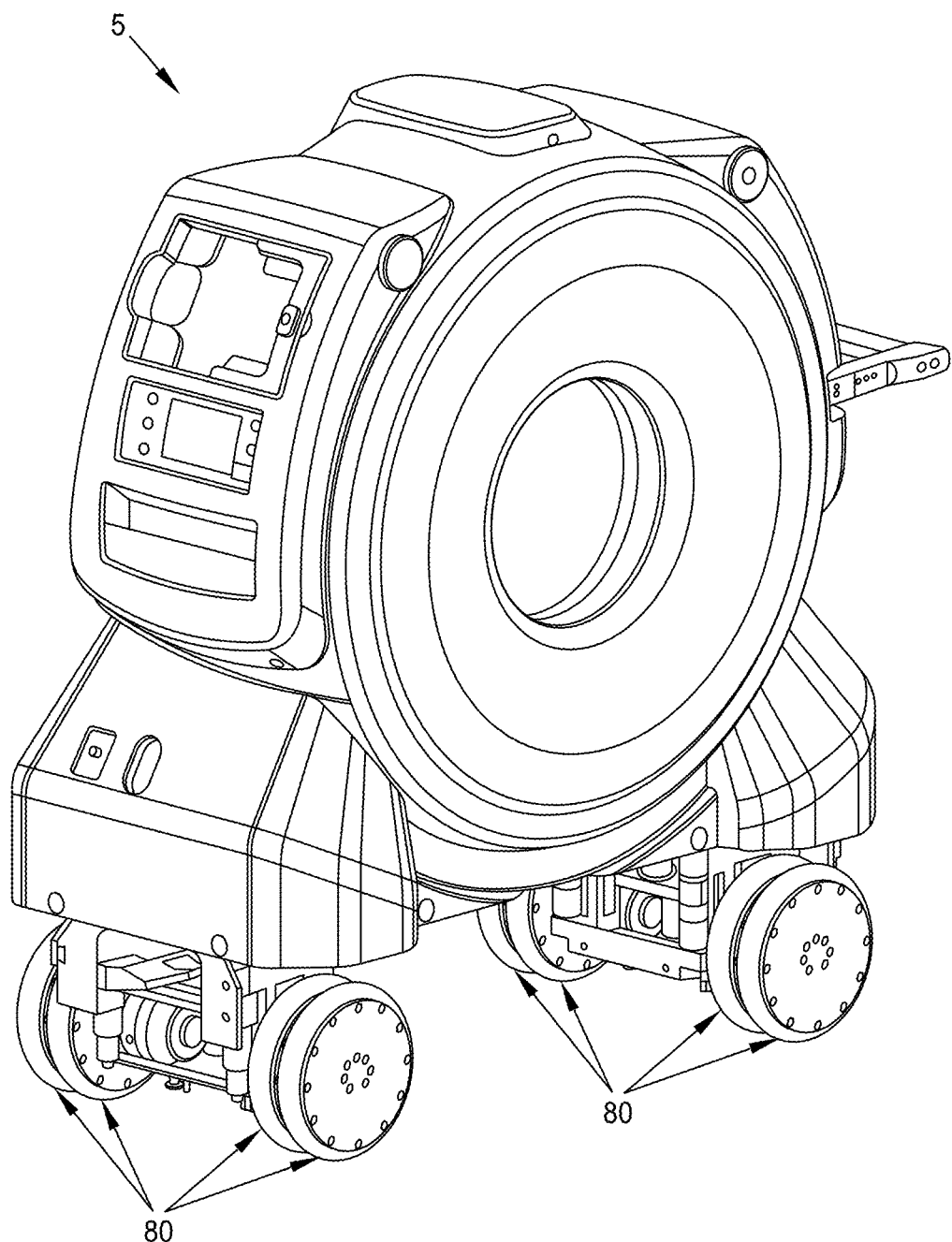
FIGS. 10 and 11 are schematic views showing another exemplary transport assembly for an exemplary mobile CT imaging system.
Figure 11:
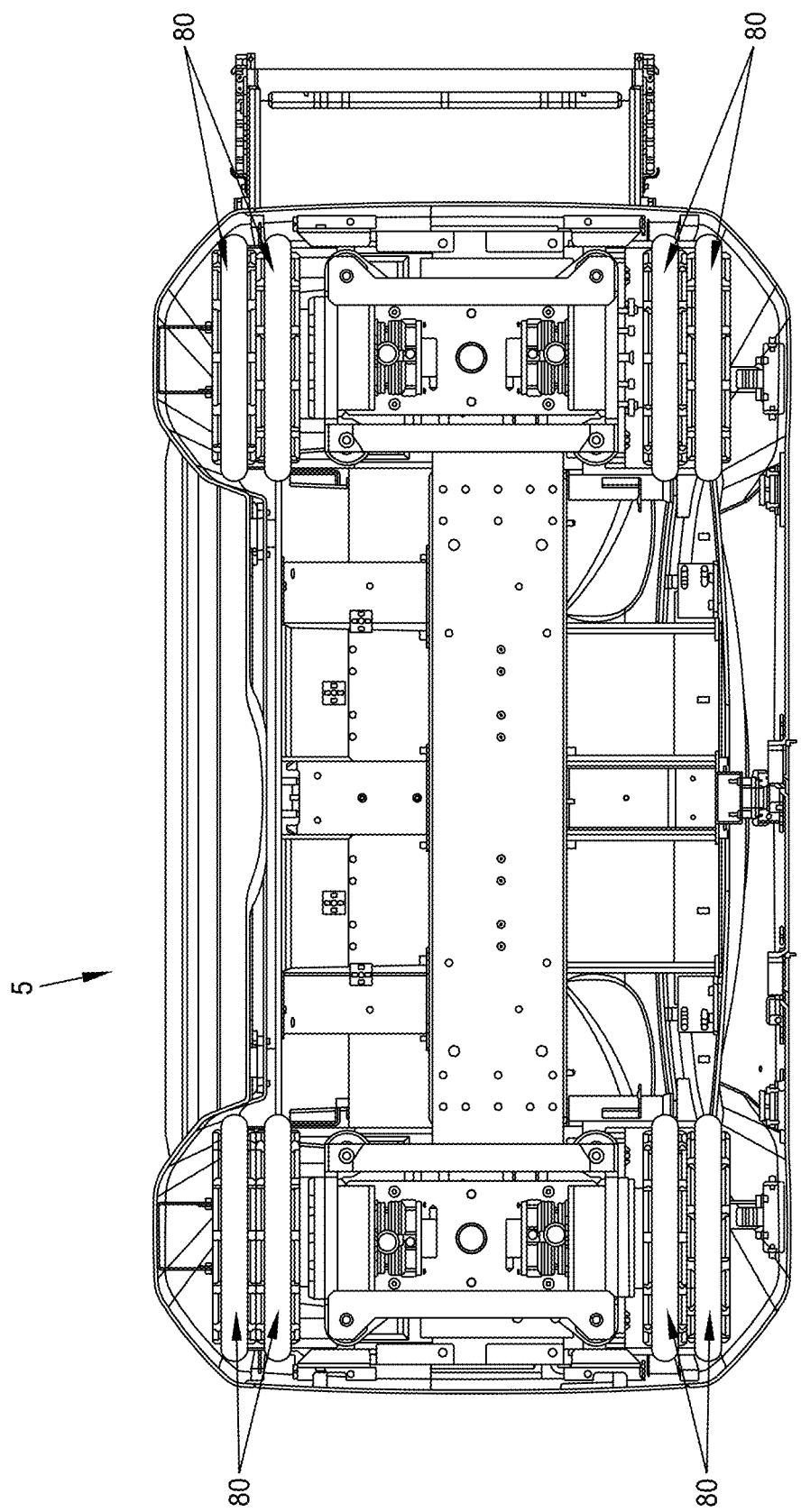
Figure 12:
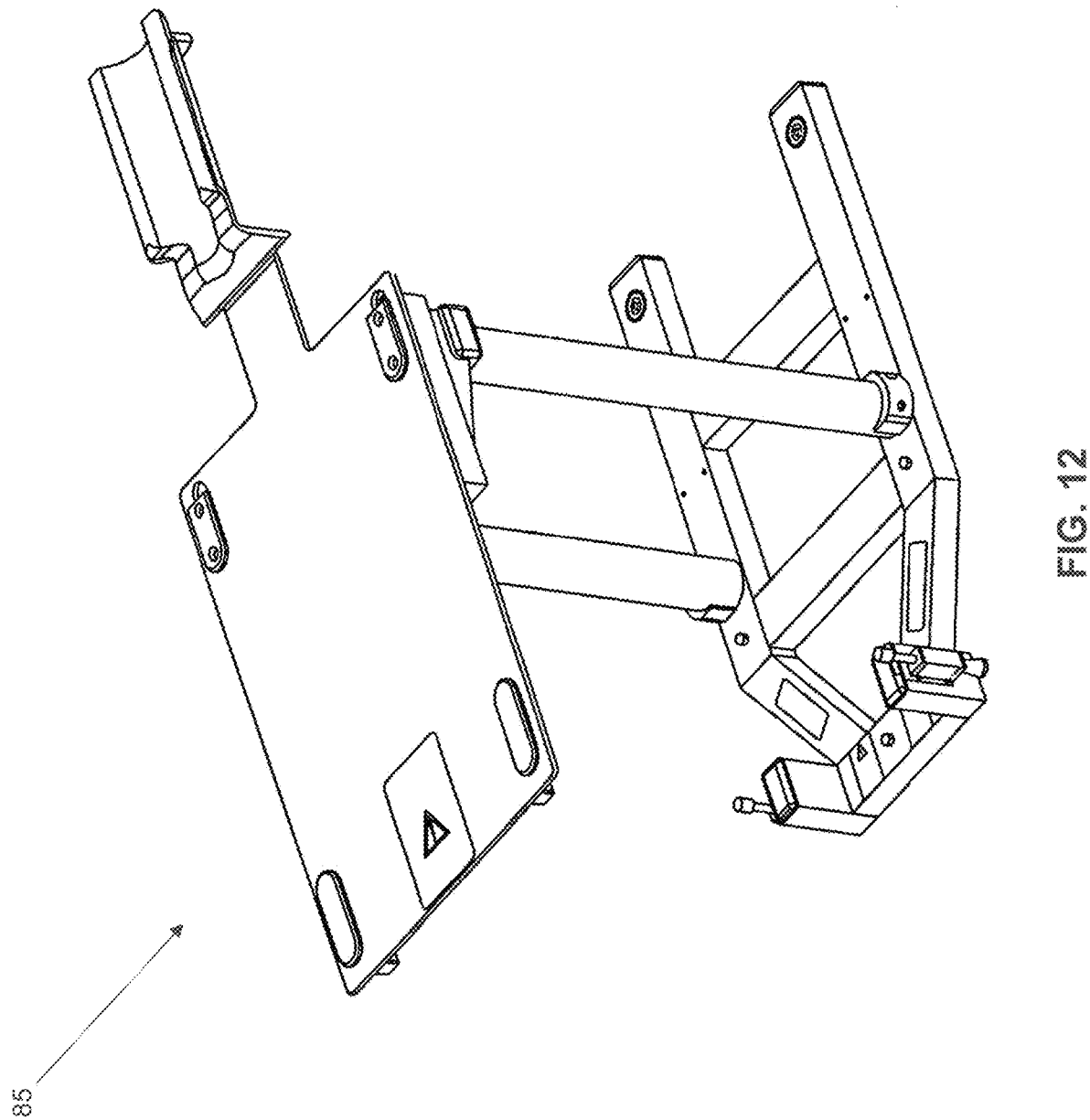
FIG. 12 is a schematic view showing an exemplary patient support for use with a mobile CT imaging system.
Figure 36:
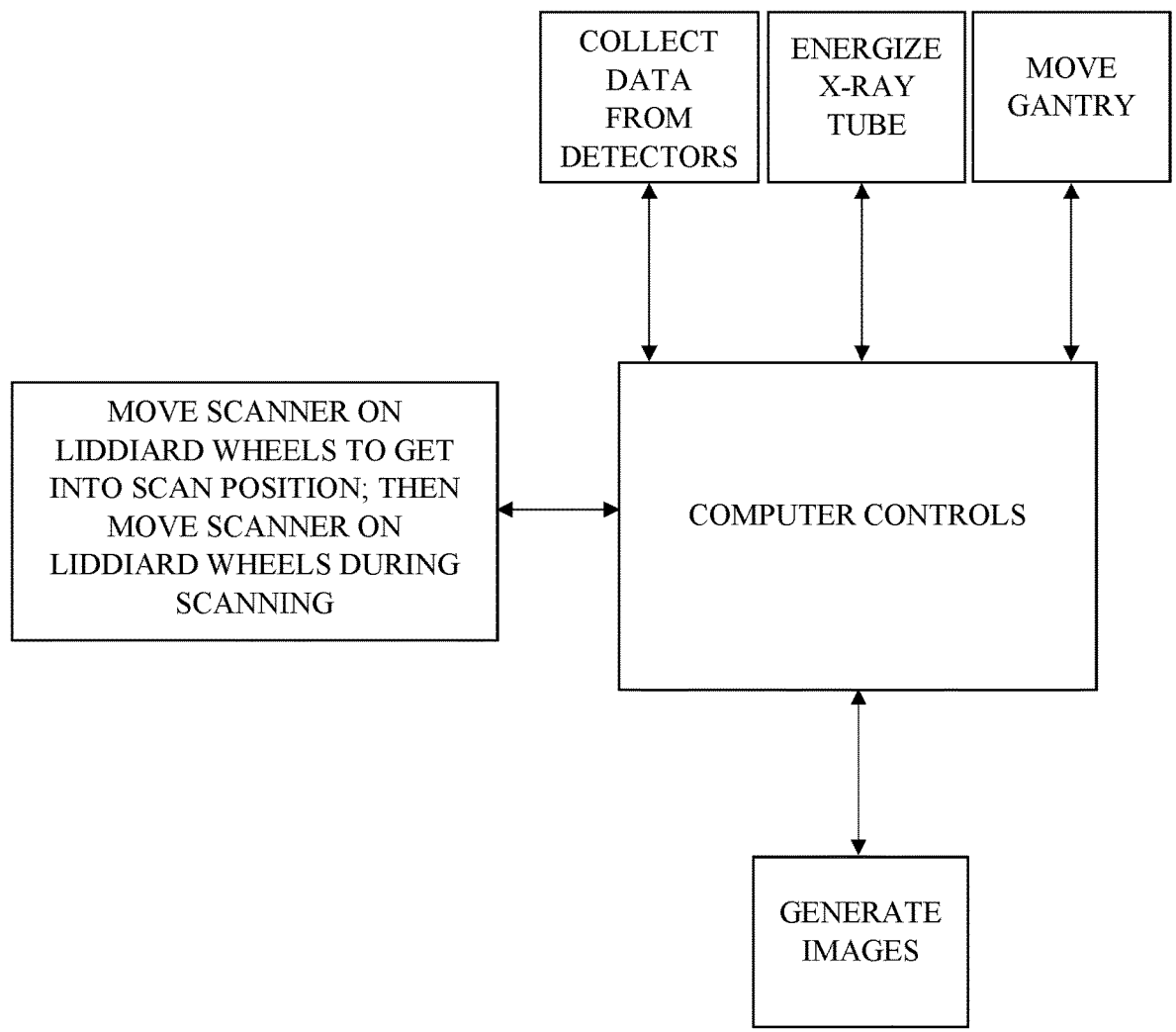

By way of still further example but not limitation, with the mobile medical scanner shown in FIGS. 10 and 11, the computer controls may be of the type shown in FIG. 36, i.e., the computer controls are configured to control: moving the gantry, energizing the X-ray tube, and collecting data from the detectors; operating the powered omnidirectional wheels (e.g., so-called "Liddiard wheels") to move the scanner between scanning locations; operating the powered omnidirectional wheels (e.g., so-called "Liddiard wheels") to move the scanner during scanning; and generating images from the data collected from the detectors.

Inasmuch as computer controls are provided for the aforementioned medical scanners to support their functionality, such prior art scanners may be modified to incorporate scanner alignment system 100 without departing from the scope of the present invention. It should be appreciated that, if desired, novel computing system 165 of the present invention may be incorporated into the existing computer controls of the aforementioned medical scanners.

Application to Other Types of Scanning Systems

It should be appreciated that scanner alignment system 100 of the present invention is not limited to use in medical applications or, indeed, to use with CT machines. Thus, for example, the present invention may be used in connection with mobile CT machines used for non-medical applications, e.g., with mobile CT machines used to scan inanimate objects. Furthermore, the present invention may be used with non-CT-type mobile scanning systems. Thus, for example, the present invention may be used in conjunction with mobile SPECT machines, mobile MRI machines, mobile PET machines, mobile X-ray machines, etc., i.e., wherever the mobile scanning machine may benefit from an autoalign feature.

Modifications

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. Apparatus for aligning a scan field of a medical scanner with a patient support, the apparatus comprising:
    at least one fiducial marker mounted to the patient support;
    a camera mounted to the medical scanner for imaging the at least one fiducial marker mounted to the patient support;
    a transport mechanism for moving the medical scanner relative to the patient support; and
    a computing system for instructing the transport mechanism to move the medical scanner to align the scan field of the medical scanner with the patient support.

2. The apparatus of claim 1 wherein the computing system is configured to obtain an image of the at least one fiducial marker from the camera and calculate at least one of (i) an angular disposition of the medical scanner relative to the patient support, (ii) a distance between the medical scanner and the patient support, and (iii) a distance between a center axis of the scan field of the medical scanner and a center axis of the patient support.

3. The apparatus of claim 2 wherein the computing system is configured to use at least one of the calculated angular disposition, the calculated distance between the medical scanner and the patient support and the calculated distance between the center axis of the scan field of the medical scanner and the center axis of the patient support to (i) rotate the medical scanner relative to the patient support, (ii) move the medical scanner along an X-axis relative to the patient support, and (iii) move the medical scanner along a Z-axis relative to the patient support, whereby to align the center axis of the scan field of the medical scanner with the center axis of the patient support.

4. The apparatus of claim 1 wherein the medical scanner comprises a CT imaging scanner, wherein the CT imaging scanner comprises a torus having a center opening, and further wherein the center opening defines the scan field.

5. The apparatus of claim 1 wherein the patient support comprises a scan board.

6. The apparatus of claim 1 wherein the patient support comprises at least two fiducial markers, and further wherein the at least two fiducial markers are mounted to the patient support in side-by-side disposition.

7. The apparatus of claim 1 wherein the transport assembly of the medical scanner comprises at least one of a gross movement mechanism and a fine movement mechanism.

8. The apparatus of claim 7 wherein the gross movement mechanism comprises powered omnidirectional wheels.

9. The apparatus of claim 8 wherein the powered omnidirectional wheels are wheels selected from the group consisting of mecanum wheels, omni wheels, ilon wheels and Liddiard wheels.

10. The apparatus of claim 7 wherein the fine movement mechanism comprises one selected from the group consisting of centipede belt drives, powered scan wheels and powered omnidirectional wheels.

11. The apparatus of claim 1 further comprising a display.

12. The apparatus of claim 11 wherein the computing system is configured to display data on the display and receive commands via the display.

13. A method for aligning a scan field of a medical scanner with a patient support, wherein the medical scanner comprises at least one camera mounted to the medical scanner and a transport mechanism for moving the medical scanner, and further wherein the patient support comprises at least one fiducial marker mounted to the patient support, the method comprising:
    using the camera to obtain an image of the at least one fiducial marker mounted to the patient support;
    calculating at least one of (i) an angular disposition of the medical scanner relative to the patient support, (ii) a distance between the medical scanner and the patient support, and (iii) a distance between a center axis of the scan field of the medical scanner and a center axis of the patient support; and
    moving the medical scanner to align the center axis of the scan field of the medical scanner with the center axis the patient support.

14. The method of claim 13 further comprising using at least one of the calculated angular disposition, the calculated distance between the medical scanner and the patient support and the calculated distance between the center axis of the scan field of the medical scanner and the center axis of the patient support to (i) rotate the medical scanner relative to the patient support, (ii) move the medical scanner along an X-axis relative to the patient support, and (iii) move the medical scanner along a Z-axis relative to the patient support, whereby to align the center axis of the scan field of the medical scanner with the center axis of the patient support.

15. The method of claim 13 further comprising imaging an object disposed on the patient support.

16. The method of claim 13 wherein the medical scanner comprises a transport mechanism for moving the medical scanner.

17. The method of claim 16 wherein a computing system instructs the transport mechanism to move the medical scanner.

18. Apparatus for aligning a scan field of a scanner with an object, the apparatus comprising:
    at least one fiducial marker mounted to the object;
    a camera mounted to the scanner for imaging the at least one fiducial marker mounted to the object;
    a transport mechanism for moving the scanner relative to the object; and
    a computing system for moving the scanner to align the scan field of the scanner with the object.

19. A method for aligning a scan field of a scanner with an object, wherein the scanner comprises at least one camera mounted to the scanner and a transport mechanism for moving the scanner, and further wherein the object comprises at least one fiducial marker mounted to the object, the method comprising:
- using the camera to obtain an image of the at least one fiducial marker mounted to the object;
- calculating at least one of (i) an angular disposition of the scanner relative to the object, (ii) a distance between the scanner and the object, and (iii) a distance between a center axis of the scan field of the scanner and a center axis of the object; and
- moving the scanner to align the center axis of the scan field of the scanner with the center axis of the object.

* * * * *